(12) United States Patent
Skinner et al.

(10) Patent No.: US 12,011,816 B2
(45) Date of Patent: Jun. 18, 2024

(54) POWER TOOL

(71) Applicant: Milwaukee Electric Tool Corporation, Brookfield, WI (US)

(72) Inventors: Luke J. Skinner, West Bend, WI (US); Kris J. Kanack, Whitewater, WI (US); James G. Ballard, Waukesha, WI (US); David R. Bauer, Delafield, WI (US); Troy A. Marks, Milwaukee, WI (US); Marc S. D'Antuono, Whitefish Bay, WI (US); Paige L. Bovard, Milwaukee, WI (US); Eric Norquist, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 99 days.

(21) Appl. No.: 17/714,065

(22) Filed: Apr. 5, 2022

(65) Prior Publication Data
US 2022/0226979 A1    Jul. 21, 2022

Related U.S. Application Data

(62) Division of application No. 16/261,488, filed on Jan. 29, 2019, now Pat. No. 11,292,118.

(Continued)

(51) Int. Cl.
*B25F 5/00*    (2006.01)
*B23D 15/14*    (2006.01)
(Continued)

(52) U.S. Cl.
CPC .............. *B25F 5/005* (2013.01); *B23D 15/14* (2013.01); *B23D 29/002* (2013.01); *B25B 27/10* (2013.01);
(Continued)

(58) Field of Classification Search
CPC .... B25B 28/00; B25F 1/02; B25F 1/04; B25F 3/00; B25F 5/005; B26B 15/00;
(Continued)

(56) References Cited

U.S. PATENT DOCUMENTS

| | | |
|---|---|---|
| 5,490,406 A | 2/1996 | College |
| 6,378,194 B1 | 4/2002 | Nghiem |

(Continued)

FOREIGN PATENT DOCUMENTS

| | | |
|---|---|---|
| CN | 101754836 B | 6/2014 |
| CN | 102528743 B | 10/2014 |

(Continued)

*Primary Examiner* — Tyrone V Hall, Jr.
(74) *Attorney, Agent, or Firm* — Quarles & Brady LLP

(57) ABSTRACT

A hydraulic tool includes a tool head and a moveable piston coupled to the tool head. The hydraulic tool head includes a plurality of jaws, which are operable to open and close for performing work on a workpiece. The hydraulic tool also includes a motor operable to drive the moveable piston to close the plurality of jaws to a closed position at which the work on the workpiece is completed. The hydraulic tool further includes a position sensor configured to detect when the plurality of jaws are at the closed position and responsively generate a sensor signal indicating that the plurality of jaws are at the closed position. Additionally, the hydraulic tool includes a controller configured to receive the sensor signal from the position sensor. The controller is configured to operate the motor based on the sensor signal that the controller receives from the position sensor.

19 Claims, 20 Drawing Sheets

Related U.S. Application Data

(60) Provisional application No. 62/729,872, filed on Sep. 11, 2018, provisional application No. 62/623,917, filed on Jan. 30, 2018.

(51) Int. Cl.

| | | |
|---|---|---|
| *B23D 29/00* | (2006.01) | |
| *B25B 27/10* | (2006.01) | |
| *B25B 27/14* | (2006.01) | |
| *B25B 28/00* | (2006.01) | |
| *B25F 5/02* | (2006.01) | |
| *B26B 15/00* | (2006.01) | |
| *H01R 43/042* | (2006.01) | |

(52) U.S. Cl.
CPC ............ *B25B 27/146* (2013.01); *B25B 28/00* (2013.01); *B26B 15/00* (2013.01); *H01R 43/0427* (2013.01); *H01R 43/0428* (2013.01); *B25F 5/02* (2013.01)

(58) Field of Classification Search
CPC .............. H01R 43/042; H01R 43/0421; H01R 43/0427; H01R 43/0428
See application file for complete search history.

(56) References Cited

U.S. PATENT DOCUMENTS

| | | | |
|---|---|---|---|
| 8,056,473 | B2 | 11/2011 | Frenken |
| 9,180,583 | B2 | 11/2015 | Frenken |
| 2002/0148274 | A1 | 10/2002 | Goop |
| 2003/0066324 | A1 | 4/2003 | Goop |
| 2015/0363510 | A1 | 12/2015 | Lin et al. |
| 2016/0031042 | A1 | 2/2016 | Gietzelt et al. |
| 2016/0363510 | A1* | 12/2016 | Kanack ............... B25B 23/1456 |
| 2017/0252911 | A1 | 9/2017 | Barezzani et al. |

FOREIGN PATENT DOCUMENTS

| | | |
|---|---|---|
| CN | 105415221 A | 3/2016 |
| CN | 103624740 B | 3/2017 |
| EP | 0941813 A1 | 9/1999 |

\* cited by examiner

POWER TOOL

CROSS REFERENCE TO RELATED APPLICATIONS

This application is a divisional of U.S. patent application Ser. No. 16/261,488, filed Jan. 29, 2019, which claims priority to U.S. Provisional Application No. 62/623,917, filed Jan. 30, 2018 and U.S. Provisional Application No. 62/729,872, filed Sep. 11, 2018.

FIELD

The present disclosure relates generally to power tools. More particularly, the present disclosure relates to a hydraulic tool having a linear sensor for sensing ram assembly movement along with other operational conditions.

BACKGROUND

Hydraulic crimpers and cutters are different types of hydraulic power tools for performing work (e.g., crimping or cutting) on a work piece by way of a work head, such as a crimping head or a cutting head. In such tools, a hydraulic tool comprising a hydraulic pump is utilized for pressurizing hydraulic fluid and transferring it to a cylinder in the tool. This cylinder causes an extendable piston or ram assembly to be displaced towards the work head. Where the power tool comprises a hydraulic crimper, the piston exerts a force on the crimping head of the power tool, which may typically include opposed crimp dies with certain crimping features. The force exerted by the piston may be used for closing the crimp dies to perform crimp or compression on a work piece at a desired crimp location.

Crimping can result in a crimp taking place at an undesired crimp location and also taking place with an improper amount of pressure being exerted during the crimp process. As such, there is a general need for a hydraulic crimp tool that enables a more efficient and more robust resultant crimp.

SUMMARY

According to an example embodiment, a hydraulic tool includes a tool head and a moveable piston coupled to the tool head. The hydraulic tool head includes a plurality of jaws, which are operable to open and close for performing work on a workpiece. The hydraulic tool also includes a motor operable to drive the moveable piston to close the plurality of jaws to a closed position at which the work on the workpiece is completed. The hydraulic tool further includes a position sensor configured to detect when the plurality of jaws are at the closed position and responsively generate a sensor signal indicating that the plurality of jaws are at the closed position. Additionally, the hydraulic tool includes a controller configured to receive the sensor signal from the position sensor. The controller is configured to operate the motor based on the sensor signal that the controller receives from the position sensor.

According to another example embodiment, a hydraulic tool includes a tool head having a plurality of crimping jaws, which are operable to open and close to crimp a workpiece. The hydraulic tool also includes a moveable piston coupled to the tool head, a motor operable to drive the moveable piston to open and close the plurality of crimping jaws, and a plurality of sensors configured to sense a plurality of conditions over a stroke of the moveable piston. The hydraulic tool also includes a controller in communication with the plurality of sensors and configured to: (i) receive sensor information from the plurality of sensors, (ii) determine, based on the sensor information, a crimp profile over the stroke of the moveable piston, and (iii) determine, based on the crimp profile, a characteristic of the crimp performed on the workpiece.

According to another example embodiment, a power tool includes a tool head having a first thread and a frame having a second thread. The tool head is rotationally coupled to the frame by a threaded engagement between the first thread and the second thread. The power tool also includes a moveable piston, a motor capable of driving the moveable piston to perform work on a work piece, and a distance sensor configured to sense a movement of the moveable piston. The distance sensor is operable to provide sensor information indicative of the movement of the piston. The power tool further includes a controller configured to receive the sensor information from the distance sensor. The power tool also includes a spring biasing the distance sensor in a direction from the frame toward the tool head such that the distance sensor maintains a fixed position in the tool head when the tool head moves axially during rotation of the tool head relative to the frame. The controller operates the motor to perform work on the work piece based in part on the sensor information that the controller receives from the distance sensor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
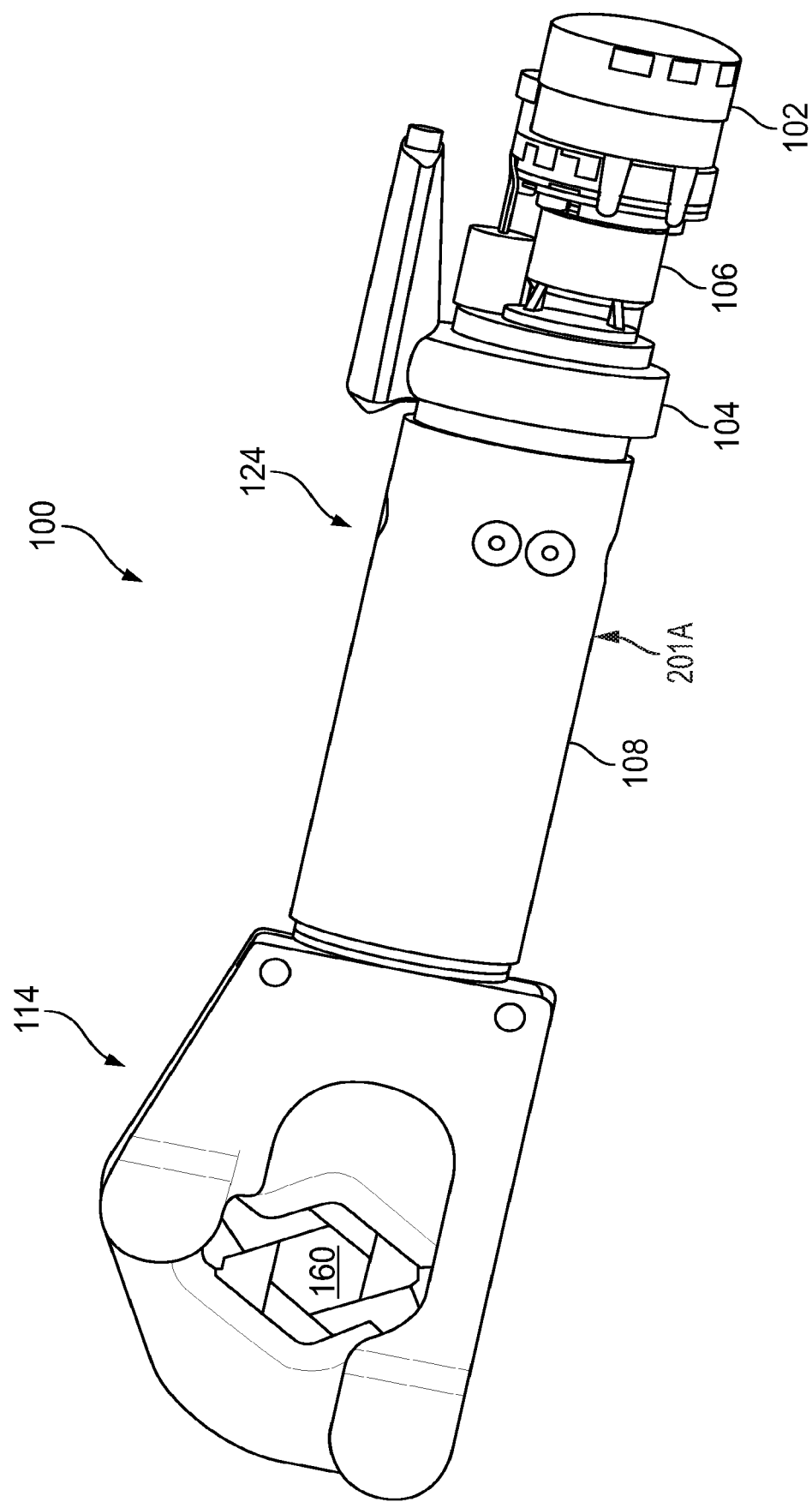
FIG. 1 illustrates a perspective view of a hydraulic tool, according to an example embodiment.
Figure 7:
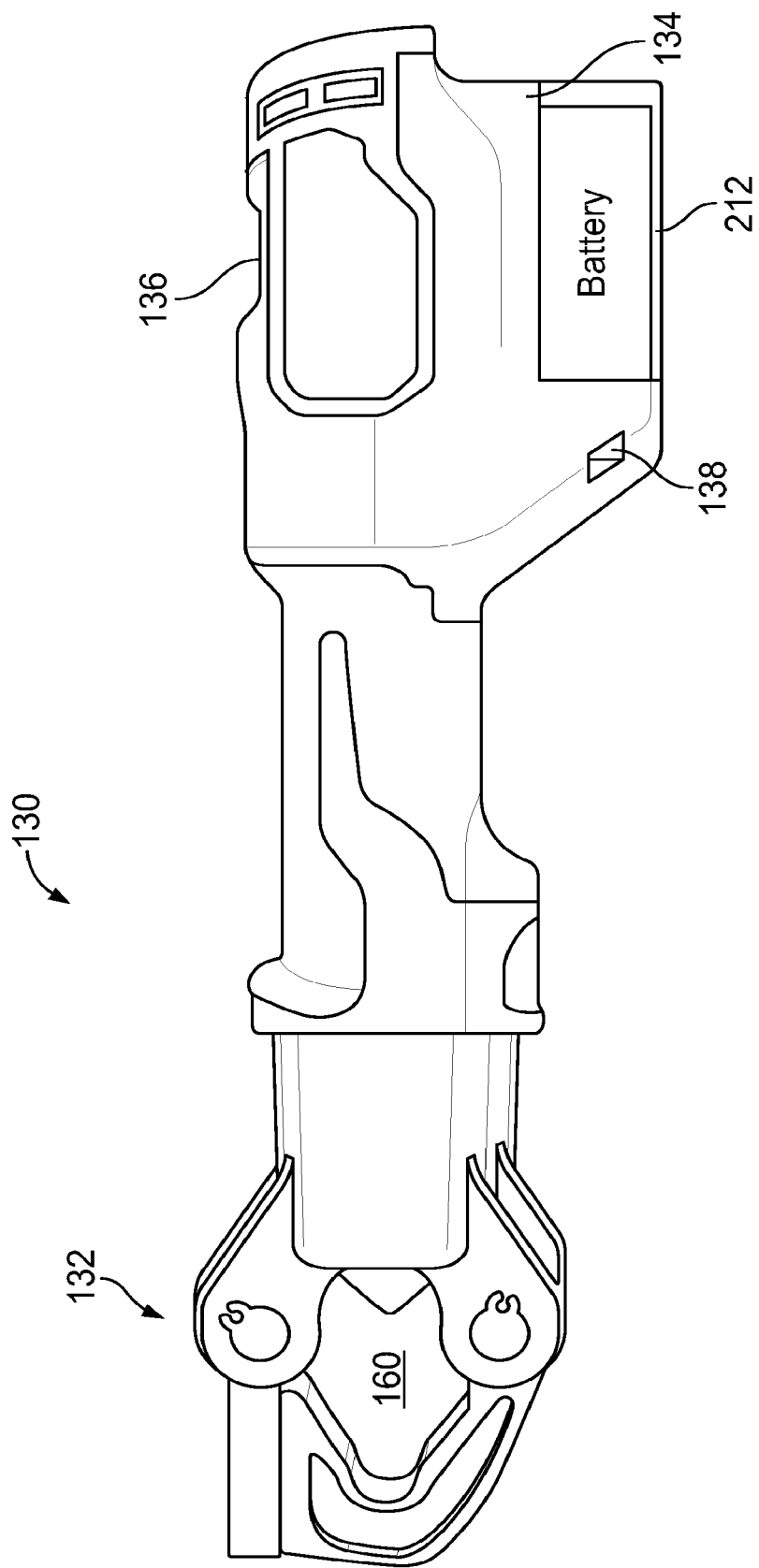
FIG. 7 illustrates an alternative hydraulic tool 130 comprising a punch-style crimping head.

FIG. 1 illustrates certain components of a hydraulic tool 100, in accordance with an example implementation. Although the example implementation described herein references an example crimping tool, it should be understood that the features of this disclosure can be implemented in other similar tools, such as cutting tools. In addition, any suitable size, shape or type of elements or materials could be used. As just one example, the illustrated hydraulic tool 100 comprises a working head that utilizes a hex or six sided crimping head 114. However, alternative styled crimping heads may also be used. As just one example, a punch-style or die less crimping head may also be used. For example, FIG. 7 illustrates an alternative hydraulic tool 130 comprising a punch-style crimping head 132.

Returning to FIG. 1, the hydraulic crimping tool 100 includes an electric motor 102 configured to drive a pump 104 by way of a gear reducer 106. The pump 104 is configured to provide pressurized hydraulic fluid to a hydraulic circuit 124 comprising a hydraulic actuator cylinder 108, which includes a piston slidably accommodated therein. The electric motor 102 is configured to drive a pump 104 by way of a gear reducer 106. The pump 104 is configured to provide pressurized hydraulic fluid to a hydraulic actuator cylinder 108, which includes a piston or ram that is slidably accommodated therein.

Figure 2:
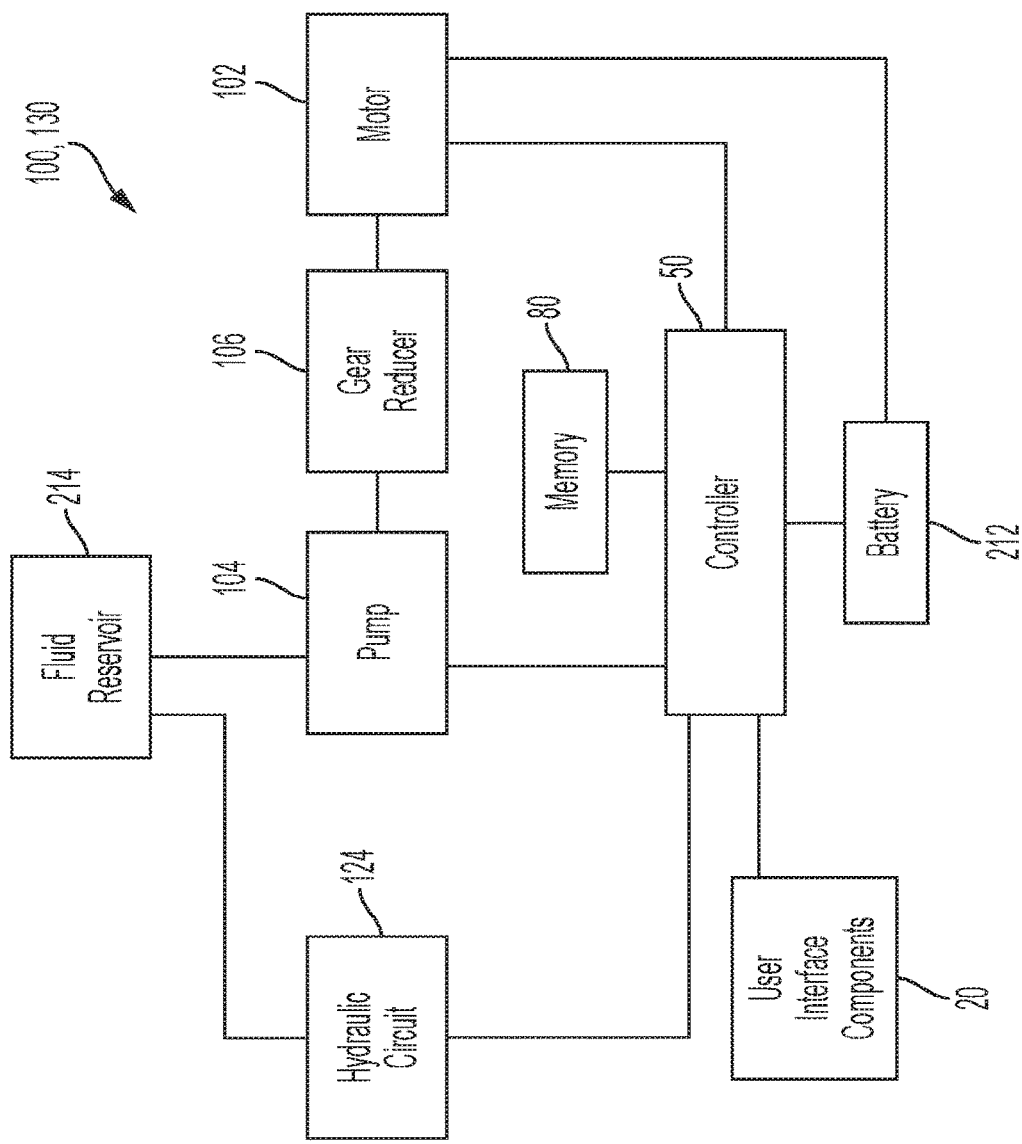
FIG. 2 illustrates a block diagram of certain components of the hydraulic tool illustrated in FIG. 1.

The hydraulic tool also comprises a controller 50. For example, FIG. 2 illustrates a block diagram of certain components of the hydraulic tools 100 and 130 illustrated in FIGS. 1 and 7. As illustrated in FIG. 2, the tool 100, 130 comprises the fluid reservoir 214 that is in fluid communication with the hydraulic circuit 124 and the pump 104. The hydraulic circuit 124 and the pump 104 provide certain operating information and operational data to the controller 50 wherein the pump 104 is operated by way of the gear reducer 106.

The controller 50 may include a processor, a memory 80, and a communication interface. The memory 80 may include instructions that, when executed by the processor, cause the controller 50 to operate the tool 100. In addition, the memory 80 may include a plurality of look up table of values. For example, at least one stored look up table may comprise work piece information or data, such as connector data. Such connector data may include, as just one example, connector type (e.g., Aluminum or Copper connectors) and may also include a preferred crimp distance for certain types of connectors and certain sizes of connectors. Such a preferred crimp distance may comprise a distance that the piston 200 and therefore the moveable crimping die 116 moves towards the crimp target area 160 (i.e., a work area) in order to achieve a desired crimp for a particular connector type having a specific size.

Figure 3:
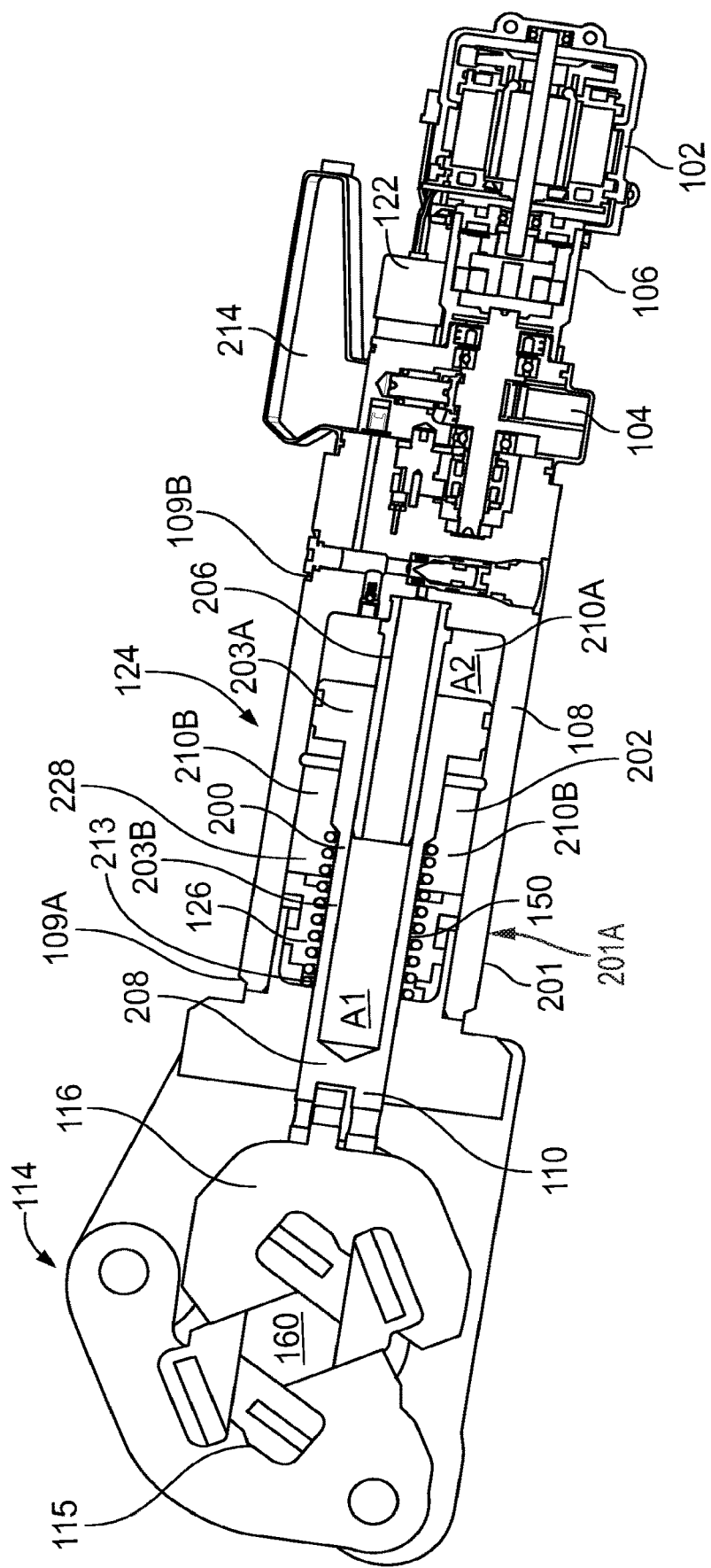
FIG. 3 illustrates another perspective view of the hydraulic tool illustrated in FIG. 1.

In one arrangement, the controller communication interface enables the controller 50 to communicate with various components of the tool 100 such as the user interface components 20, the motor 102, memory 80, the battery 212, and various components of the hydraulic circuit 124 (e.g., a pressure sensor 122, and a linear distance sensor 150) (see, e.g., FIG. 3).

The battery 212 may be removably connected to a portion of the hydraulic tool, such as a bottom portion 134 of the hydraulic tool. By way of example, as illustrated in FIG. 7, the battery 212 may be removably connected to a bottom portion 134 of the hydraulic tool 130, away from the crimping head 132. However, the battery 212 could be removably mounted to any suitable position, portion, or location on the frame of the hydraulic tool 130.

As illustrated in FIG. 2, the hydraulic tool 100 may further comprise user interface components 20 that provide input to the power tool, such as the controller 50 of the power tool. As will be described, such user interface components 20 may be used to operate the hydraulic tool 100. For example, such user interface components 20 may comprise an operator panel, one or more switches, one or more push buttons, one or more interactive indicating lights, soft touch screens or panels, and other types of similar switches such as a trigger switch. As just one example, and as illustrated in FIG. 7, the user interface 136 may reside along a top surface of the hydraulic tool 130. The hydraulic tool may also comprise a trigger switch 138 mounted along the bottom portion of hydraulic tool, near the battery 212.

Figure 13:
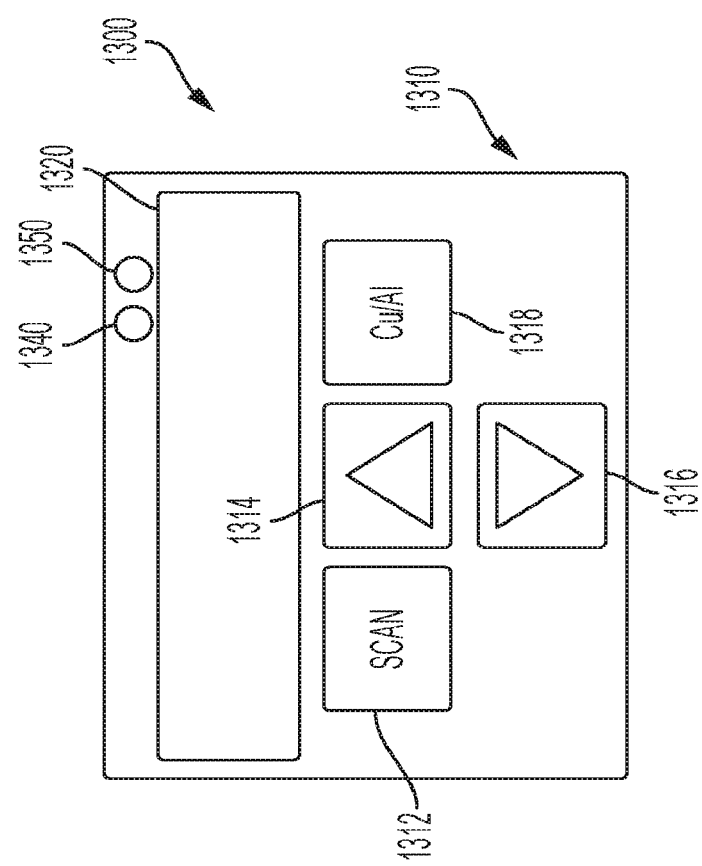
FIG. 13 illustrates an exemplary operator panel that may be used with a hydraulic tool.

FIG. 13 illustrates an exemplary operator panel 1300 that may be used with a hydraulic tool, such as the hydraulic tool illustrated in FIG. 7. In this operator panel arrangement 1300, the operator panel comprises a plurality of soft-touch operator buttons 1310 residing below a display 1320, such as a liquid crystal display (LCD). In this illustrated arrangement, four buttons are provided: a first button 1312 comprising a scan button, a second button 1314 comprising an increase button 1314, and a third button comprising a decrease button 1316.

A fourth button 1318 comprising a select connector type button may also be provided. For example, prior to a crimp, a user can use the fourth button 1318 to either select a Cu connector, an Al connector or other connector type. The operator panel 1300 further comprises a first LED 1340 and a second LED 1350. The first LED may be some other color than the second LED. For example, the first LED 1340 may comprise a green LED and the second LED may comprise a red LED. Alternative LED configurations may also be used.

Figure 4:
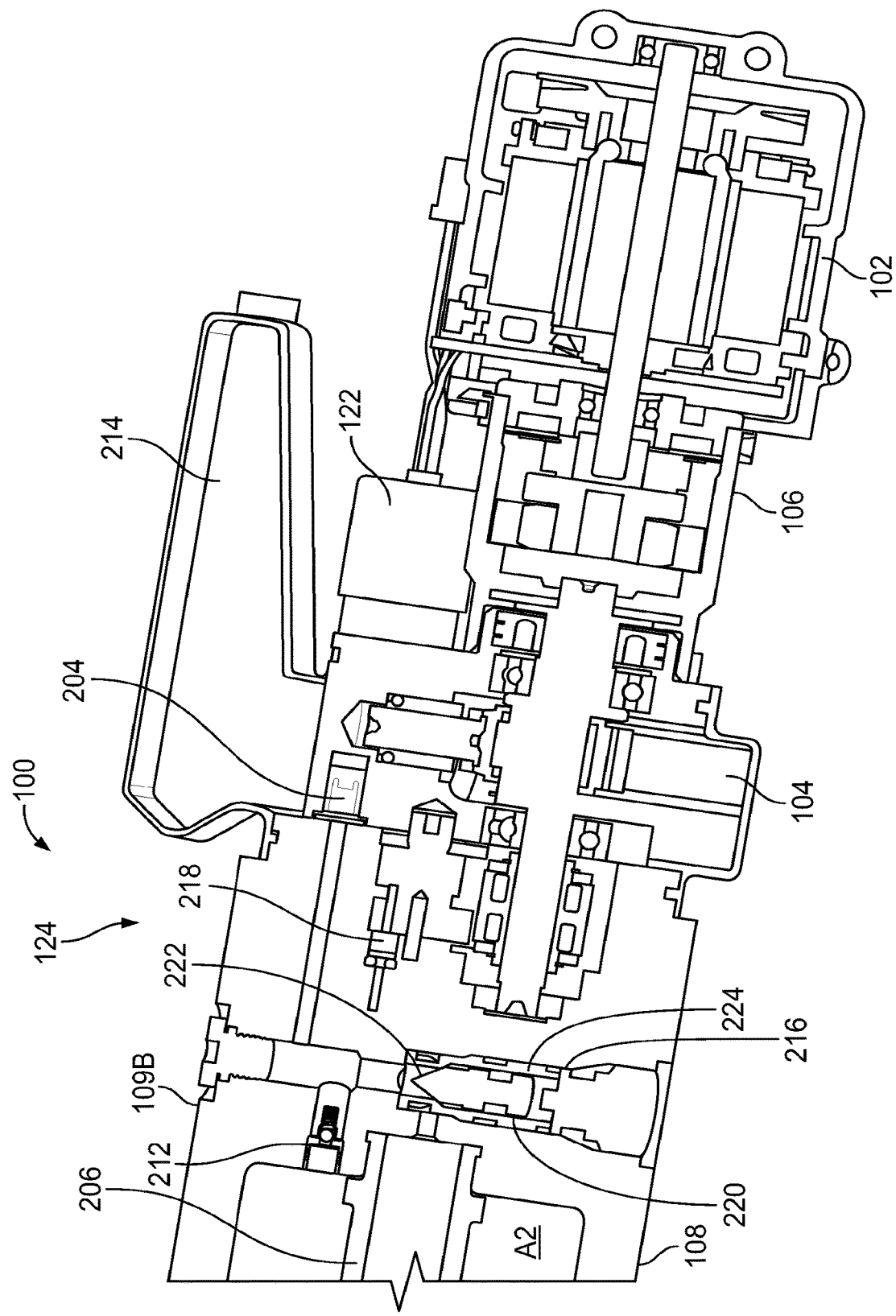
FIG. 4 illustrates another perspective view of the hydraulic tool illustrated in FIG. 1.

FIG. 3 illustrates another perspective view of the hydraulic tool illustrated in FIG. 1 and FIG. 4 illustrates another perspective view of the hydraulic tool illustrated in FIG. 1. And now referring to FIGS. 3 and 4, positioned near the piston 200 is a linear distance sensor 150. In this illustrated arrangement, the linear distance sensor 150 is mounted within a cylindrical bushing 126 that surrounds the piston rod 203A of the piston 200. This linear distance sensor 150 will operate to detect a linear displacement of the piston 200 during a crimping action. Specifically, based on the movement of the piston 200 during a crimping action, the linear distance sensor 150 will generate an output signal that is communicated to the controller 50. This output signal is representative of a distance that the piston 200 has traveled from a particular reference point position of the ram or piston 200. In one preferred arrangement, this particular reference point will be the position of the piston 200 when the piston 200 has been completely retracted to a most proximal position (e.g., a home position), as illustrated in FIGS. 1 and 3.

The linear distance sensor 150 also provides information as to the direction of motion of the piston 200. That is, the linear distance sensor 150 can make a determination if the piston 200 is moving or extending towards a crimp target or if the piston 200 is moving away from or retracting away from the crimp target. This direction motion information may also be communicated to the controller 50. The controller 50 may operate the tool based in part on this information, such as controlling the position of the piston during a crimp sequence. For example, the controller 50 may utilize this information to retract of the moveable ram to a predetermined position such that the controller controls the return position of the ram so subsequent crimps can be made without a full ram retraction, back to a home position. In addition, the controller 50 may utilize this information to drive or move the moveable ram to a predetermined position, for example, to hold a connector in place at a given position before a crimp sequence.

Exemplary linear distance sensors include, but are not limited to, linear variable differential transformer sensors, photoelectric distance sensors, optical distances sensors, and hall effect sensors. For example, such a hall effect sensor may comprise a transducer that varies its output voltage in response to a magnetic field created by an outer contour of an outer surface 213 of the moveable piston 200. As just one example, grooves, slots and/or protrusions 215 may be machined, etched, engraved, or otherwise provided (e.g., by way of a label) along the outer surface 213 of the piston 200.

In this illustrated hydraulic tool example, a frame and a bore of the tool 100 form the hydraulic actuator cylinder 108. The cylinder 108 has a first end 109A and a second end 109B. The piston is coupled to a link mechanism 110 that is configured to move the moveable crimp head 116 of a crimp head 114. The first end 109A of the cylinder 108 is proximate to the crimp head 116, whereas the second end 109B is opposite the first end 109A.

When the piston is retracted, the moveable head 116 may be pulled back to a fully retracted or a home position as shown in FIGS. 1 and 3. Alternatively, the moveable head 116 may be pulled back to a partially retracted position.

When pressurized fluid is provided to the cylinder 108 by way of the pump 104, the fluid pushes the piston 200 inside the cylinder 108, and therefore the piston 200 extends towards the crimp target placed within the work area 160. As the piston 200 extends through the cylindrical bushing 126, the linear sensor 150 senses the movement of piston 200 and provides this information to the controller 50.

In one preferred arrangement, the linear sensor 150 continuously senses the movement of the piston 200. As just one example, the linear sensor 150 may continuously sense the movement of the piston 200 during one or more of the entire crimp process as the ram assembly moves towards the crimping head, performs the crimp, and then retracts. However, as those of ordinary skill in the art will recognize, alternative sensing arrangements may also be utilized. As just one example, in certain arrangements, the controller may utilize the linear sensor 150 to sense the movement of the piston 200 only during a specified period of time (e.g., only during when the piston rod 200 is driven towards the work piece or only during a crimping action). In yet an alternative arrangement, the linear sensor 150 may be utilized to only periodically sense the movement to the piston 200.

As the piston 200 extends, the link mechanism 110 causes the moveable crimp head 116 to move towards the stationary head 115, and may therefore cause the working heads 115, 116 to act upon or crimp a connector that has been placed in the crimp work area 160. When the crimping operation is performed, the controller 50 can provide instructions to the hydraulic circuit 124 to stop the motor 102 and thereby release the high pressure fluid back to a fluid reservoir 214 as described in greater detail herein.

As mentioned, to increase the efficiency of the hydraulic tool 100, it may be desirable to have a tool where the piston 200 could move at non-constant speeds and apply different loads based on a state of the tool, the crimping operation, and/or the type of crimp that is desired. For instance, the piston 200 may be configured to advance rapidly at a fast speed while travelling within the cylinder 108 before the moveable crimping head 116 reaches a connector to be crimped. Once the moveable crimping head 116 reaches the connector, the piston 200 may slow down, but cause the moveable crimp head 116 to apply a large force to perform the crimp operation. Described next is an exemplary hydraulic circuit 124 that is configured to control the crimping operation of the hydraulic tool 100.

Returning to FIGS. 3 and 4, the tool 100 includes a partially hollow piston 200 moveably accommodated within the cylinder 108, which is formed by a frame 201 and a bore 202 of the tool 100. The piston 200 includes a piston head 203A and a piston rod 203B extending from the piston head 203A along a central axis direction of the cylinder 108. As shown, the piston 200 is partially hollow. Particularly, the piston head 203A is hollow and the piston rod 203B is partially hollow, and thus a cylindrical cavity 230 is formed within the piston 200.

The motor 102 drives the pump 104 to provide pressurized fluid through a check valve 204 to an extension cylinder 206. The extension cylinder 206 is disposed in the cylindrical cavity formed within the partially hollow piston 200. The piston 200 is configured to slide axially about an external surface of the extension cylinder 206. However, the extension cylinder 206 is affixed to the cylinder 108 at the second end 109B, and thus the extension cylinder 206 does not move with the piston 200.

The piston 200, and particularly the piston rod 203B, is further coupled to a ram 208. The ram 208 is configured to be coupled to and drive the moveable crimp head 116.

The piston head 203A divides an inside of the cylinder 108 into two chambers: a first chamber 210A and a second chamber 210B. The chamber first 210A is formed between a surface of the piston head 203A that faces toward the ram 208, a surface of the piston rod 203B, and a wall of the cylinder 108 at the first end 109A. The second chamber 210B is formed between the a surface of the piston head 203A that faces toward the motor 102 and the pump 104, the external surface of extension cylinder 206, and a wall of the cylinder 108 at the second end 109B. Respective volumes of the first chamber 210A and the second chamber 210B vary as the piston 200 moves linearly within the cylinder 108. The second chamber 210B includes a portion of the extension cylinder 206.

The pump 104 is configured to draw fluid from the fluid reservoir 214 to pressurize the fluid and deliver the fluid to the extension cylinder 206 after a user initiates a crimp command. Such a crimp command may come by way of the user entering such a command by way of the user interface components 20 (see, FIG. 2). For example, a crimp command could be initiated by the user entering a crimp command by way of the user interface 136 or the toggle switch 136 as illustrated in FIG. 7.

The reservoir 214 may include fluid at a pressure close to atmospheric pressure, e.g., a pressure of 15-20 pounds per square inch (psi). Initially, the pump 104 provides low pressure fluid to the extension cylinder 206. The fluid has a path through the check valve 204 to the extension cylinder 206. The fluid is blocked at high pressure check valve 212 and a release valve 216, which is coupled to, and actuatable by the controller 50.

The fluid delivered to the extension cylinder 206 applies pressure on a first area $A_1$ within the piston 200. As illustrated, the first area $A_1$ is a cross section area of the extension cylinder 206. The fluid causes the piston 200 and the ram 208 coupled thereto to advance rapidly. Particularly, if the flow rate of the fluid into the extension cylinder 206 is Q, then the piston 200 and the ram 208 move at a speed equal to $V_1$, where $V_1$ could be calculated using the following equation:

$$V_1 = \frac{Q}{A_1} \quad (1)$$

Further, if the pressure of the fluid is $P_1$, then the force $F_1$ applied on the piston 200 could be calculated using the following equation:

$$F_1 = P_1 A_1 | \quad (2)$$

Further, as the piston 200 extends within the cylinder 108, hydraulic fluid is pulled or drawn from the reservoir 214 through a bypass check valve 218 into the chamber 210B. As the piston 200 begins to extend, pressure in the second chamber 210B is reduced below the pressure of the fluid in the fluid reservoir 214, and therefore the fluid in the fluid reservoir 214 flows through the bypass check valve 218 into the chamber 210B and fills the second chamber 210B. Preferably, the controller 50 is monitoring both the pressure hydraulic fluid by way of the pressure sensor 122 and is also monitoring the movement of the piston 200 based on input that it receives from the linear distance sensor 150.

As the piston 200 and the ram 208 extend, the moveable crimping die 116 and stationary crimping die 115 move toward each other in preparation for crimping a connector placed within the crimping area 160. As the moveable die 116 reaches the connector, the connector resists this motion. Increased resistance from the connector causes pressure of the hydraulic fluid provided by the pump 104 to rise.

The tool 100 includes a sequence valve 120 that includes a poppet 220 and a ball 222 coupled to one end of the poppet 220. A spring 224 pushes against the poppet 220 to cause the ball 222 to prevent flow through the sequence valve 120 until the fluid reaches a predetermined pressure set point that exerts a force on the ball exceeding the force applied by the spring 224 on the poppet 220. For example, the predetermined pressure set point that causes the sequence valve 120 to open could be between 350 and 600 psi; however, other pressure values are possible. This construction of the sequence valve 120 is an example construction for illustration, and other sequence valve designs could be implemented.

Once the pressure of the fluid exceeds the predetermined pressure set point, fluid pressure overcomes the spring 224 and the sequence valve 120 opens, thus allowing the fluid to enter the second chamber 210B. As such, the fluid now acts on an annular area $A_2$ of the piston 200 in addition to the area $A_1$. Thus, the fluid acts on a full cross section of the piston 200 ($A_1 + A_2$). For the same flow rate Q, used in equation (1), the piston 200 and the ram 208 now move at a speed equal to $V_2$, where $V_2$ could be calculated using the following equation:

$$V_2 = \frac{Q}{A_1 + A_2} \quad (3)$$

As indicated by equation (3), $V_2$ is less than $V_1$ because of the increase in the area from $A_1$ to ($A_1 + A_2$). As such, the piston 200 and the ram 208 slow down to a controlled speed that achieves a controlled, more precise working operation. However, the pressure of the fluid has increased to a higher value, e.g., $P_2$, and thus the force applied on the piston 200 also increases and could be calculated using the following equation:

$$F_2 = P_2 (A_1 + A_2) | \quad (4)$$

$F_2$ is greater than $F_1$ because of the area increase from $A_1$ to ($A_1 + A_2$) and the pressure increase from $P_1$ to $P_2$. Thus, when the sequence valve 120 opens, high pressure hydraulic fluid can enter both the extension cylinder 206 and the chamber 210B to cause the ram 208 to apply a large force that is sufficient to crimp a connector at a controlled speed.

Higher pressure fluid is now filling the chamber 210B due the opening of the sequence valve 120. The high pressure fluid pushes a ball of the bypass checkvalve 218 causing the bypass check valve 218 to close, thus preventing fluid from the chamber 210B to flow back to the fluid reservoir 214. In other words, the bypass check valve 218 has fluid at reservoir pressure on one side and high pressure fluid in the chamber 210B on the other side. The high pressure fluid shuts off the bypass check valve 218, which thus does not allow fluid to be drawn from the reservoir 214 into the chamber 210B.

The tool 100 includes a pressure sensor 122 configured to provide sensor information indicative of pressure of the fluid. The pressure sensor 122 may be configured to provide the sensor information to the controller 50.

As will be described in greater detail with reference to the flowcharts of FIGS. 5 and 6, once the piston 200 begins to experience an increased pressure as it exerts an initial crimp force on an outer surface of the connector, the controller 50 will be directed to a lookup table for certain desired values. In one arrangement, based on user input information, the controller 50 will extract the desired crimp distance and a desired crimp pressure. The controller 50 then operates the motor 102 and the hydraulic circuit 124 so as to drive the piston 200 to this targeted crimp distance and to this targeted crimp pressure. When the linear distance sensor 150 senses that the piston 200 has moved to this targeted crimp distance, the controller 50 can then determine that the initiated crimp of the identified connector is complete.

Once the connector is crimped and the piston 200 reaches an end of its stroke within the cylinder 108, hydraulic pressure of the fluid increases because the motor 102 may continue to drive the pump 104. The hydraulic pressure may keep increasing until it reaches a threshold pressure value. In an example, the threshold pressure value could be 8500 psi; however, other values are possible. Once the controller 50 receives information from the pressure sensor 122 that the pressure reaches the threshold pressure value, the controller 50 may shut off the motor 102 so as to retract the piston and the ram 208 back to a desired position, such as a home or fully retracted position.

In one example, the tool 100 includes a return spring 228 disposed in the first chamber 210A. The spring 228 is affixed at the end 109A of the cylinder 108 and acts on the surface of the piston head 203A that faces toward the piston rod 203B and the ram 208. When piston retraction has been actuated, the spring 228 pushes the piston head 203A back. Also, pressure of fluid in the extension cylinder 206 and the second chamber 210B is higher than pressure in the reservoir 214. As a result, hydraulic fluid is discharged from the extension cylinder 206 through the release valve 216 back to the reservoir 214. At the same time, hydraulic fluid is discharged from the second chamber 210B through the high pressure check valve 212 and the release valve 216 back to the reservoir 214, while being blocked by the check valve 218 and the check valve 204. Particularly, the check valve 204 prevents back flow into the pump 104.

Within some examples, the exterior surface of the frame 201 can provide a gripping portion 201A to facilitate handling of the hydraulic tool 100. In one implementation, the gripping portion 201A of the hydraulic tool 100 can have a diameter of less than approximately 70 millimeters (mm). In another implementation, the gripping portion 201A of the hydraulic tool 100 can have a diameter of approximately 65 mm. These implementations can provide for a relatively small, ergodynamic feature, which can be gripped by an operator to handle and/or stabilize the hydraulic tool 100 while applying a relatively high force to a workpiece or connector (e.g., approximately seven tons of output force or greater, approximately 15 tons of output force or greater, etc.).

In some examples, the gripping portion 201A of the frame 201 can include a plurality of handle halves (not shown) made of, for instance, a plastic and/or a rubber material. The handle halves can enhance the tactile experience by providing a particular geometry, texture, and/or hardness that facilitates gripping the hydraulic tool 100. However, in other examples, the gripping portion 201A of the frame 201 can omit the handle halves as shown in FIGS. 1-2. This can help to reduce (or minimize) the diameter of the hydraulic tool 100 at the gripping portion 201A.

To further reduce (or minimize) the diameter of the hydraulic tool 100 at the gripping portion 201A, the gripping portion 201A can be made from a relatively high strength material (e.g., relative to aluminum) such as, for example, steel. By using a relatively high strength material the wall of the gripping portion 201A can be made relatively thin, thereby reducing the diameter of the gripping portion 201A. For example, a wall of the gripping portion 201A comprising steel can be approximately 4 mm to approximately 6 mm in thickness. Alternatively, a wall of the gripping portion 201A comprising aluminum can be approximately 6 mm to approximately 7 mm in thickness.

Figure 5:
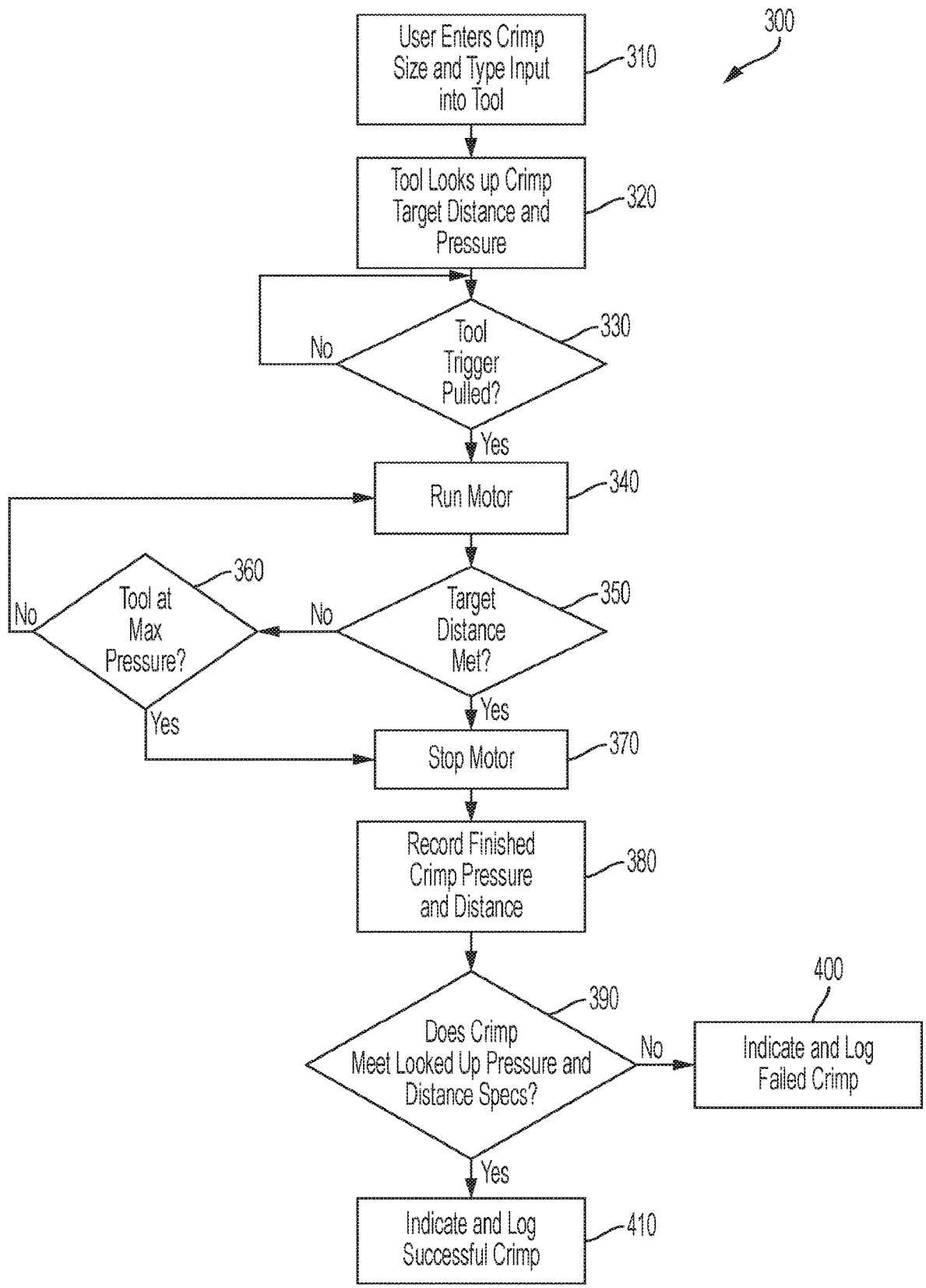
FIG. 5 illustrates a flowchart of an example crimping method utilizing a hydraulic tool, according to an example embodiment.

FIG. 5 shows a flowchart of an example method 300 for crimping a connector by using a die less hydraulic crimper, according to an example embodiment. Method 300 shown in FIG. 5 presents an embodiment of a method that could be used using the hydraulic tool as shown in FIGS. 1-4, and 7, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 310-410. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 310, the method 300 includes the step of a user entering certain information related to a desired crimp into the hydraulic tool. Such information may be entered into the tool via user interface components 20 as previously described. For example, at block 310, a user may enter a type of connector that will be crimped. That is, the user may enter that an Aluminum connector is being crimped or that a Copper connector is being crimped. In addition, once the type of connector is selected and input into the tool, the user may be called upon to enter the size of the connector size into the hydraulic tool. Based on this entered data, the controller 50 of the hydraulic tool 100, 130 will be able to determine a targeted crimp pressure to ensure a proper crimp. In addition, based on this entered data, the controller 50 of the hydraulic tool 100, 130 will also be able to determine a targeted crimp distance that the piston 200 will move in order to perform the desired crimp.

For example, once this data has been entered into the tool, at block 320, the method 300 includes the step of the controller 50 looking up the crimp target distance and the crimp pressure that is to be used for the specific information input at block 310. The method 300 utilizes, at least in part, the information that a user inputs at block 310 to look up these crimp target distance and crimp pressures. Such crimp information may be contained in a look up table that is stored in the memory 80 that is accessible by way of a controller 50. (See, e.g., FIG. 2).

At block 330, the method 300 queries by way of the controller 50 whether a tool trigger has been pulled in order to commence or initiate a crimp. For example, such a tool trigger may comprise the trigger switch 138 as illustrated in FIG. 7. If at block 330, the controller 50 determines that the tool trigger has not been pulled, then the method 300 returns back to the start of block 330 and waits a certain period of time to query again whether the tool trigger has been pulled.

If at block 330, the controller 50 determines that the tool trigger has been pulled, a crimping action commences. That is, the method 300 will proceed to block 340 where the controller 50 initiates activation of the hydraulic tool motor 102. After the motor 102 has been activated, as herein described, internal pressure within the hydraulic tool will begin to increase. Once the ram or piston 200 begins to move in a distal direction or in a crimping direction, the controller 50 will detect and monitor the movement of the piston 200 as it moves in this direction. Specifically, piston 200 movement will be detected and monitored by way of the linear distance sensor 150 in order to determine if the piston 200 moves the targeted crimp distance, as previously determined by the controller 50 at block 320. After the piston 200 begins its movement towards the crimping target as herein described, at block 350, the controller 50 monitors whether the piston 200 achieves its target crimp distance. In one preferred arrangement, the target crimping distance may be determined by the controller 50 by analyzing position information that it receives from the linear distance sensor 150 as described herein. If at block 350 the controller 50 determines that the piston 200 has not yet reached the target crimp distance, the method 300 proceeds to block 360. At block 360 of the method 300, the controller 50 determines if the hydraulic circuit 124 of the hydraulic tool 100 resides at maximum hydraulic pressure, preferably by way of a pressure transducer (e.g., pressure transducer 122). If at block 360 the method 300 determines that the maximum hydraulic pressure has not been reached, then the method 300 returns to block 340 and the controller 50 continues to operate the motor 102 so to increase fluid pressure within the hydraulic circuit 124 so as to continue to drive the piston 200 towards the crimp work area 160.

Alternatively, if at block 360, the controller 50 determines that a tool maximum pressure has been reached, then the method 300 proceeds to block 370 where the motor 102 is stopped.

After the motor has been stopped at block 370, the method 300 proceeds to block 380 where certain operating parameters may be recorded by the controller 50. For example, at block 370, the controller 50 may record the final crimp pressure as well as the crimp distance that the piston 200 traveled in order to complete the desired crimp. Thereafter, the method 300 proceeds to block 390 where the controller 50 may make a determination if the resulting crimp met the desired looked up crimp pressure and the desired crimp distance. For example, in one arrangement, the controller 50 would compare the recorded finished pressure and distance recorded at block 380 with the target crimp distance and target crimp pressure that the controller 50 pulled from the look up table at block 320. If these pressure and/or distance values do not compare favorably, the method 300 proceeds to block 400 where the resulting failed crimp failure is indicated and then perhaps logged. Alternatively, if these values do favorably compare, then the method 300 proceeds to block 410 wherein a successful crimp may be indicated to the user, as described herein. In one arrangement, the controller 50 may also store this successful crimp in memory 80 and may also be logged in a tracking log, also stored in memory 80.

In addition, the successful crimp may be visually and/or audibly noted to a user of the power tool 100 by way of some type of human interface device: e.g., illumination of a green light emitting diode of some other similar indication by way of one of the user interface components 20. Alternatively, or additionally, an operator interface may be provided along a surface of the tool housing that provides such a visual and/or graphical confirmation that the previous crimp comprises a successful crimp. This could be the same or different operator interface that the user utilized at block 310 where the user enters crimp size and connector type information prior to crimp initiation.

Figure 6:
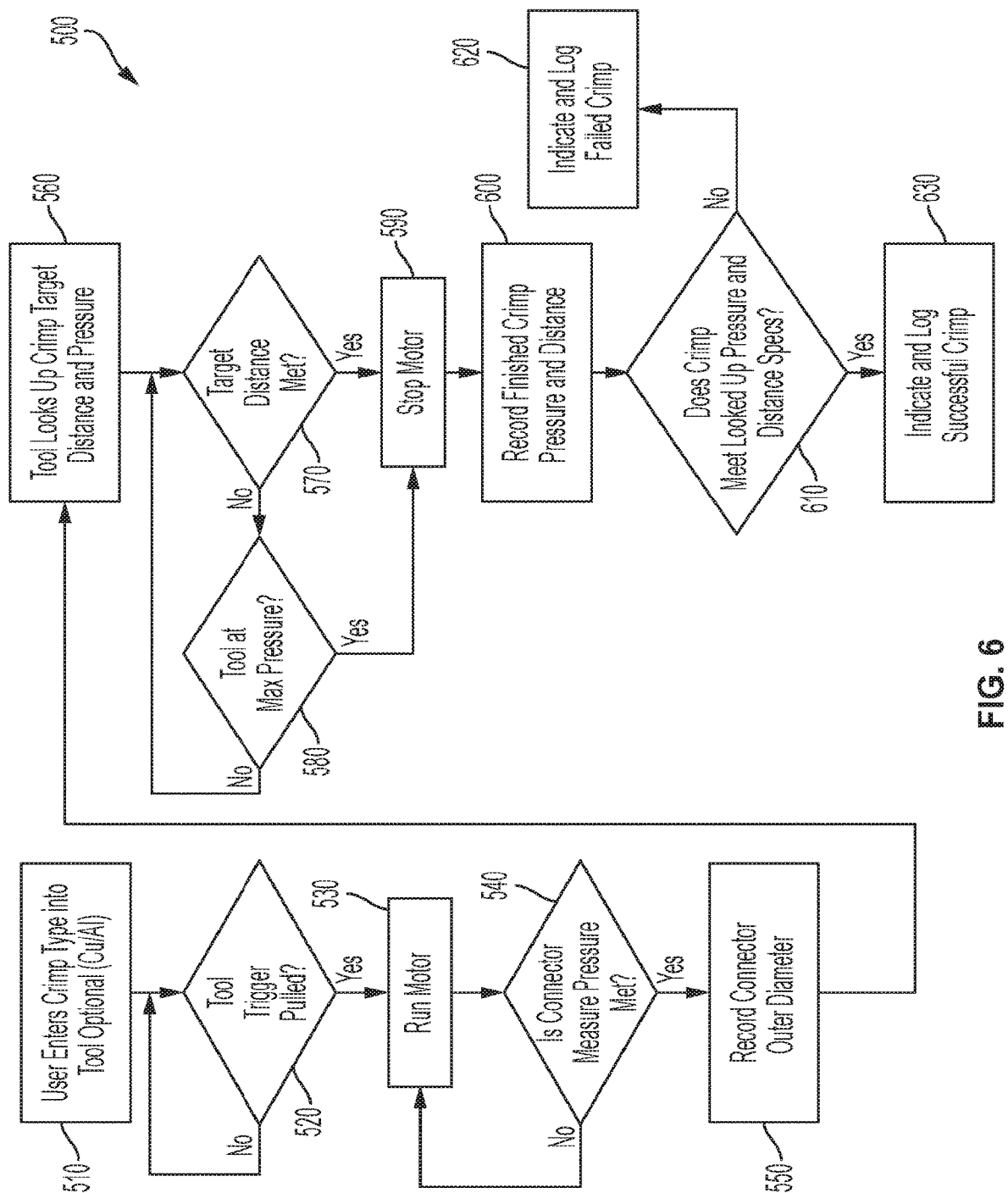
FIG. 6 illustrates a flowchart of an example crimping method utilizing a hydraulic tool, according to an example embodiment.

FIG. 6 shows a flowchart of an alternative method 500 for crimping by using a die less hydraulic crimper, according to an example embodiment that does not require initial user input prior to initiating a crimp. Method 500 shown in FIG. 6 presents an embodiment of a method that could be used using the hydraulic tools 100, 130 as shown in FIGS. 1-4 and 7, for example. Method 500 may include one or more operations, functions, or actions as illustrated by one or more of blocks 510-630. Also, the various blocks may be combined into fewer blocks, divided into additional blocks, and/or removed based upon the desired implementation.

At block 510, the method 500 includes an optional step of a user entering certain information prior to initiation of a desired crimp. For example, at block 510, a user may enter a type of connector that will be crimped. For example, the user may enter that either an Aluminum connector is being crimped or that a Copper connector is being crimped.

At block 520, the controller 50 of the hydraulic tool queries whether the tool trigger has been pulled in order to initiate a crimping operation. If at block 520, the hydraulic tool controller 50 determines that no tool trigger has yet been pulled, the method 500 cycles back to block 510 and waits a certain period of time before this query is made again.

If at block 520 the controller 50 determines that the tool trigger has been pulled, a crimping action is initiated. That is, the method 500 proceeds to block 530 where the controller 50 starts the motor 102 such that hydraulic tool pressure will increase within the hydraulic circuit 124, as described herein. After hydraulic pressure increases within the hydraulic circuit 124, the piston 200 begins to move in the distal direction, towards the crimping head 114. After movement of the piston 200, the hydraulic tool 100 will detect and monitor the internal pressure of the tool 100, as determined at block 540. For example, pressure may be monitored by the controller 50 as it receives feedback information from the pressure sensor 122. Specifically, the controller 50 will monitor the pressure to determine if a threshold pressure is detected. This threshold pressure will determine whether the piston 200 has first engaged an outer surface of a connector to be crimped. After the piston 200 begins its distal movement towards the crimping target, at block 540, the controller 50 determines whether and when the tool achieves the threshold pressure also referred to as connector measure pressure.

If the controller 50 determines that the connector measure pressure has been met, and that therefore the piston 200 is starting to exert a force upon the outer diameter of the connector being crimped, the method proceeds to block 550. At block 550, a connector outer diameter is measured. In one preferred arrangement, this connector outer diameter may be measured by utilizing the linear distance sensor 150. For example, the linear distance sensor 150 may provide distance information as to how far the piston 200 has traveled from a reference position (i.e., the piston home or retracted position). And since the controller 50 can determine the relative position of the piston 200 at that point in time, the controller 50 will therefore be able to determine the connector outer diameter. The controller 50 can therefor record this outer diameter in memory 80.

After the connector outer diameter has been determined at block 550, the controller 50 looks up a target crimp distance and a target crimp pressure via a lookup table, preferably stored in memory 80. Pressure within the hydraulic circuit 124 continues to increase so that the piston 200 continues to move towards the crimping head 114 so as to complete the crimp. Next, at block 570 of method 500, the controller 50 queries whether the targeted crimp distance has been achieved by the piston 200. As previously described herein, in one arrangement, the controller 50 would receive this distance information regarding the targeted crimp distance from the linear distance sensor 150.

If the controller 50 determines from the distance information provided by the linear distance sensor 150 that the targeted crimp distance has not yet been achieved, the method proceeds to block 580. At block 580, the controller 50 determines if the hydraulic tool resides 100 at a maximum hydraulic tool pressure. Preferably, the controller 50 receives pressure information from the pressure sensor 122 for this determination. If at block 580, the controller 50 determines that the maximum hydraulic tool pressure has been reached, then the method 500 proceeds to block 590 where the controller 50 initiates a stoppage of the tool motor 102.

Alternatively, if at block 570, the controller 50 determines that a target crimp distance has been achieved (i.e., that the piston has indeed traveled the desired crimp target distance), then the method 500 proceeds to block 590 where the controller 50 issues an action to stop the motor 102. As a result, the hydraulic circuit 124 will act as described herein so as to return the hydraulic fluid back to the fluid reservoir 214.

After the motor 120 has been stopped at block 590, the method 500 proceeds to block 600 where certain operating parameters may be recorded and/or information logged. For example, at block 600, the controller 50 may record the final crimp pressure within the hydraulic circuit 124 as well as the final crimp distance that the piston 120 traveled so as to complete the crimp. Thereafter, the method 500 proceeds to block 610 wherein the controller 50 makes a determination as to whether the completed crimp conforms with the looked up pressure and the distance that was determined at block 560. For example, the controller 50 could compare the recorded finished pressure and distance recorded at block 600 with the targeted distance and pressure determined at block 560.

If these pressure and/or distance values do not compare favorably, the method 500 proceeds to block 620 where a crimp failure is indicated and then logged as a failed crimp. Alternatively, if these values do favorably match, then the method 500 proceeds to block 630 wherein a successful crimp is indicated to the user. In one arrangement, the controller 50 may store this successful crimp in memory 80 and may also be logged in a tracking log.

In addition, the successful crimp may be visually and/or audibly noted to a user of the power tool 100 by way of some type of human interface device: illumination of a green light emitting diode of some other user interface component 20. Alternatively, or additionally, an operator interface may be provided along a surface of the tool housing that provides such a visual and/or graphical confirmation that the previous crimp comprises a successful crimp. This could be the same or different operator interface that the user utilized at block 510 where the user enters crimp size and connector type information prior to crimp commencement was entered into the power tool prior to crimp initiation.

Figure 8:
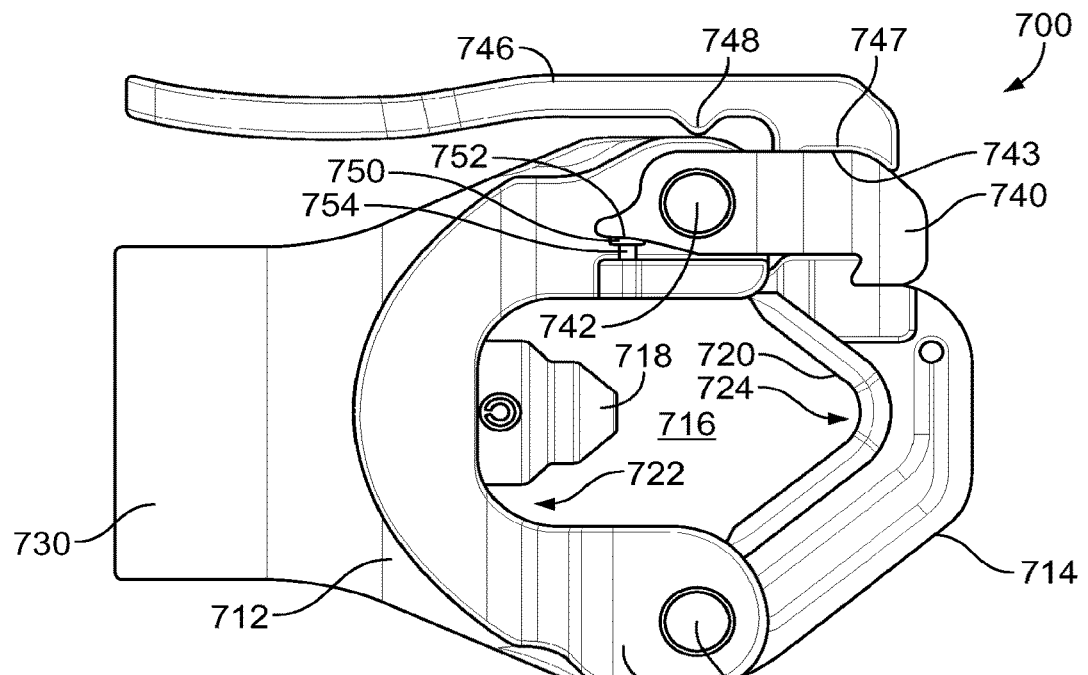
FIG. 8 is a plan side view of a crimping tool head in a closed state according to an example embodiment.
Figure 9:
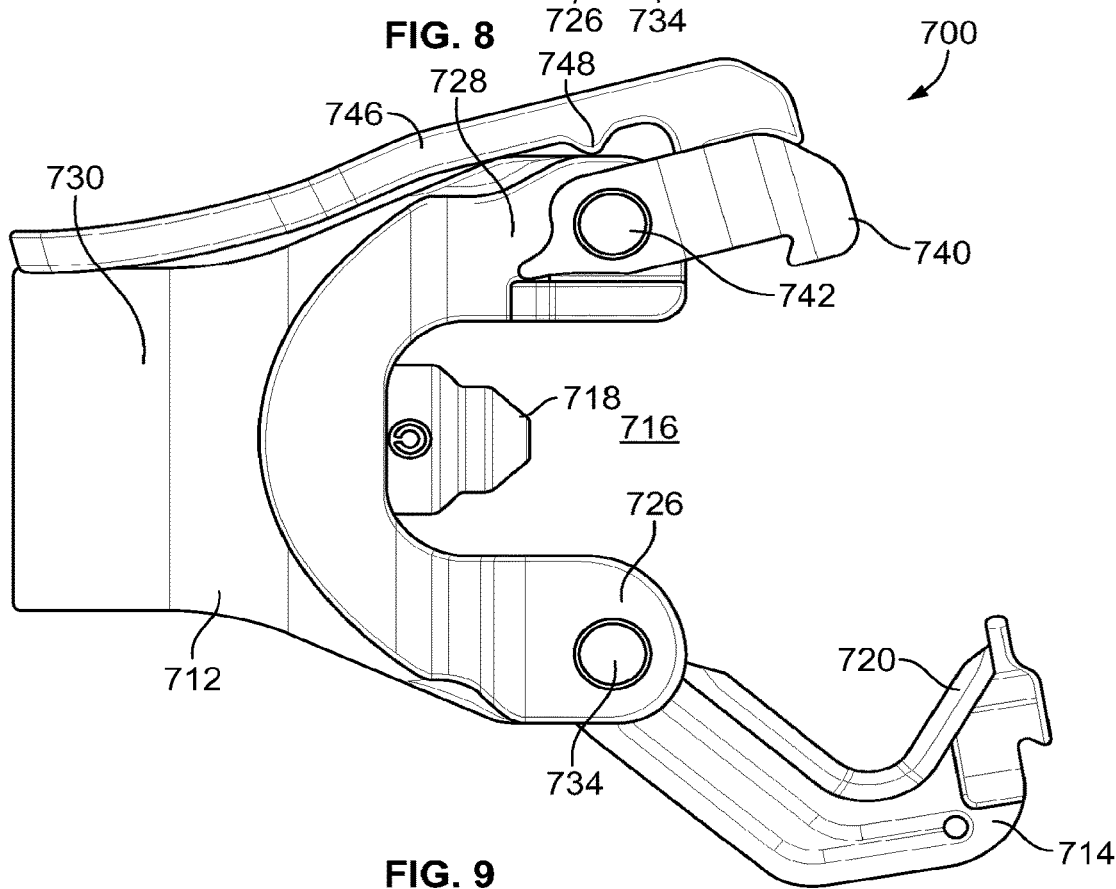
FIG. 9 is a plan side view of a crimping tool head in an open state according to the example embodiment of FIG. 8.
Figure 10:
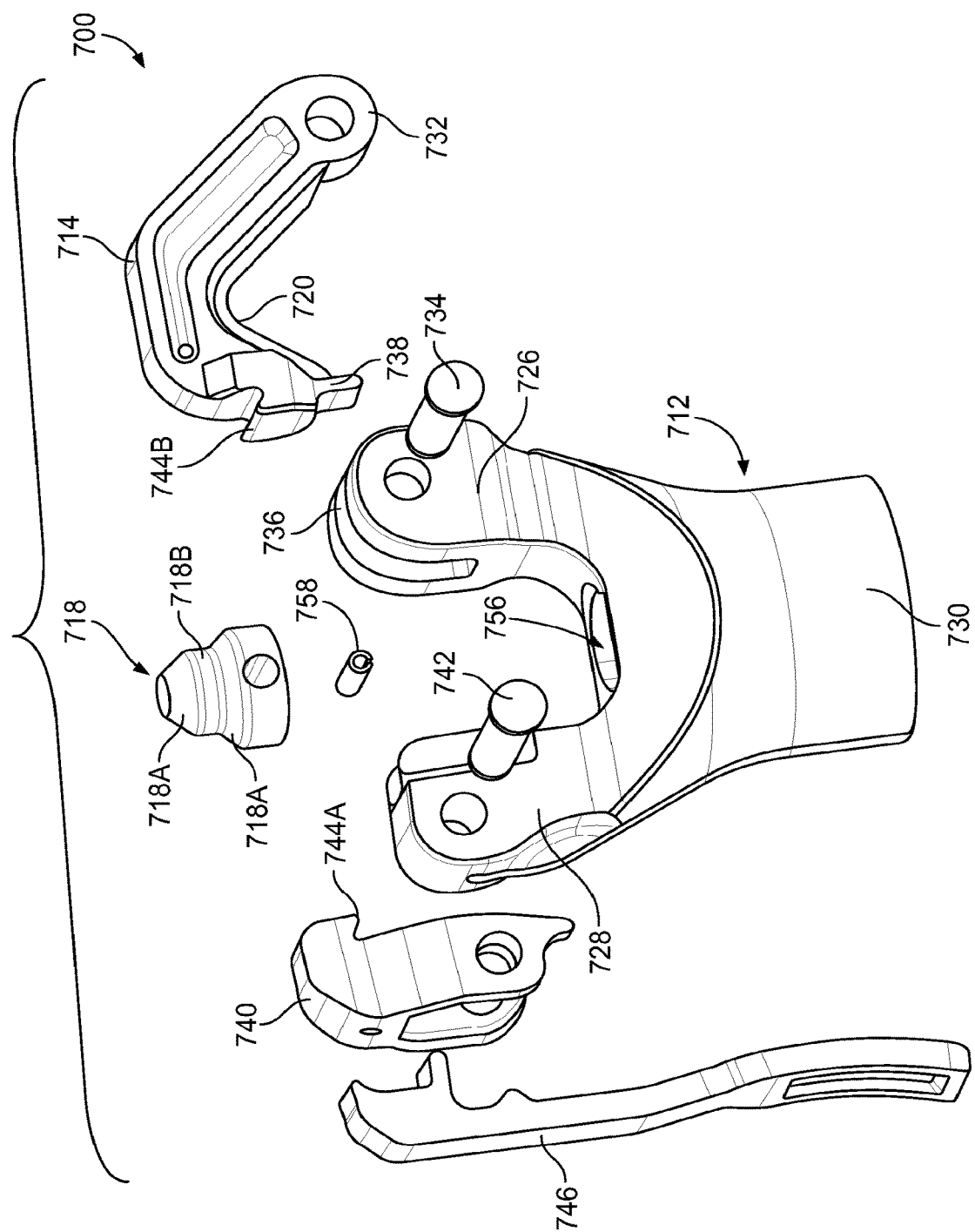
FIG. 10 is an exploded view of the crimping tool head according to the example embodiment of FIG. 8.

FIGS. 8-10 depict a crimping tool head 700 according to an example embodiment of the present disclosure. As just one example, the crimping tool head or work head 700 may be utilized with a hydraulic tool as disclosed herein, such as the hydraulic tool 10 illustrated in FIG. 1 and the hydraulic tool 130 illustrated in FIG. 7. Specifically, FIG. 8 depicts a side view of the crimping tool head 700 in a closed state, FIG. 9 depicts a side view of the crimping tool head 700 in an open state, and FIG. 10 depicts an exploded view of the crimping tool head 700.

As shown in FIGS. 8-10, the crimping tool head 700 includes a first frame 712 and a second frame 714. The second frame 714 is movable relative to the first frame 712 such that the crimping tool head 700 can be (i) opened to insert one or more objects into a crimping zone 716 of the crimping tool head 700, and (ii) closed to facilitate crimping the object(s) in the crimping zone 716. In particular, to crimp an object and/or a work piece positioned within the crimping zone 716, the crimping tool head 700 includes a ram 718 slidably disposed in the first frame 712 and a crimping anvil 720 on the second frame 714. The ram 718 is movable from a proximal end 722 of the crimping zone 716 to the crimping anvil 720 at a distal end 724 of the cutting zone 716. The ram 718 and the crimping anvil 720 can thus provide a compression force to the object(s) (e.g., metals, wires, cables, and/or other electrical connectors) positioned between the ram 718 and the crimping anvil 720 in the crimping zone 716.

As shown in FIGS. 8-10, the ram 718 can have a shape that generally narrows in a direction from the proximal end 722 towards the distal end 724. As such, a cross-section of a distal-most end of the ram 718 can be smaller than a cross-section of a proximal-most end of the ram 718. As one example, the ram 718 can have a generally pyramidal shape. As another example, the ram 718 can have a plurality of sections, including one or more inwardly tapering sections 718A and one or more cylindrical sections 718B (see FIG. 10).

As also shown in FIGS. 8-10, the crimping anvil 720 can have a shape that generally narrows in the direction from the proximal end 722 towards the distal end 724. As examples, the crimping anvil 720 can have a generally V-shaped surface profile or a generally U-shaped surface profile. In some implementations, the shape and/or dimensions of the ram 718 can generally correspond to the shape and/or dimensions of the crimping anvil 720, and vice versa. Due, at least in part, to the narrowing shape of the ram 718 and the crimping anvil 720, the crimping tool head 700 can advantageously crimp object(s) with greater force over a smaller surface area than other tool heads (e.g., crimping tools having a generally flat ram and a generally flat crimping anvil). This, in turn, can help to improve electrical performance of objects coupled by the crimping operation.

As described above, the crimping tool head 700 can be coupled to an actuator assembly, which is configured to distally move the ram 718 to crimp the object(s) in the crimping zone 716. For example, the actuator assembly can include a hydraulic pump, and/or an electric motor that distally moves the ram 718. Additionally, for example, the actuator assembly can include a switch, which is operable to cause the ram 718 to move between the proximal end 722 and the distal end 724. For instance, the switch can be movable between a first switch position and a second switch position. When the switch is in the first switch position, the actuator assembly causes the ram 718 to be in a retracted position (e.g., at the proximal end 722). Whereas, when the switch is in the second switch position, the actuator causes the ram 718 to move toward the crimping anvil 724 to crimp the object(s) in the crimping zone 716.

Additionally, as shown in FIGS. 8-10, the first frame 712 has a first arm 726 and a second arm 728 extending from a base 730. The first arm 726 is generally parallel to the second arm 728. The first arm 726 and the second arm 728 are also generally of equivalent length. In this configuration, the first frame 712 is in the form of a clevis (i.e., U-shaped); however, the first frame 712 can have a different form in other examples. Additionally, although the first frame 712 is formed from a single piece as a unitary body in the illustrated example, the first frame 712 can be formed from multiple pieces in other examples.

As noted herein, the second frame 714 includes the crimping anvil 720. In FIGS. 8-10, the crimping anvil 720 is integrally formed as a single piece unitary body with the second frame 714. In an alternative example, the crimping anvil 720 can be coupled to the second frame 714. For instance, the crimping anvil 720 can be releasably coupled to the second frame 714 via one or more first coupling members, which extend through one or more apertures in the crimping anvil 720 and the second frame 714. By releasably coupling the crimping anvil 720 to the second frame 714, the crimping anvil 720 can be readily replaced and/or repaired.

The second frame 714 is hingedly coupled to the first arm 726 at a first end 732 of the second frame 714. In particular, the second frame 714 can rotate between a closed-frame position as shown in FIG. 8 and an open-frame position as shown in FIG. 9. In the closed-frame position, the second frame 714 extends from the first arm 726 to the second arm 728 such that the crimping zone 716 is generally bounded by the ram 718, the crimping anvil 720, the first arm 726, and the second arm 728. In the open-frame position, the second frame 714 extends away from the second arm 728 to provide access to the crimping zone 716 at the distal end 724.

In FIGS. 8-10, the second frame 714 is hingedly coupled to the first arm 726 via a first pin 734 extending through the first end 732 of the second frame 714 and a distal end portion of the first arm 726. The distal end portion of the first arm 726 includes a plurality of prongs 736 separated by a gap, the first end 732 of the second frame 714 is disposed in the gap between the prongs 736. This arrangement can help to improve stability and alignment of the second frame 714 relative to the first frame 712. This in turn helps to improve alignment of the ram 718 and the crimping anvil 720 during a crimping operation. Despite these benefits, the second frame 714 can be hingedly coupled to the first arm 726 differently in other examples.

A second end 738 of the second frame 714 is releasably coupled to the second arm 728, via a latch 740, when the second frame 714 is in the closed-frame position. In general, the latch 740 is configured to rotate relative to the second arm 728 between (i) a closed-latch position in which the latch 740 can couple the second arm 728 to the second frame 714 as shown in FIG. 8 and (ii) an open-latch position in which the latch 740 releases the second arm 728 from the second frame 714 as shown in FIG. 9. For example, the latch 740 can be hingedly coupled to the second arm 728 via a second pin 742, and the latch 740 can thus rotate relative to the second arm 728 about the second pin 742. Although FIG. 9 shows the latch 740 in the open-latch position while the second frame 714 is in the open-frame position, the latch 740 can be in the open-latch position when the second frame 714 is in other positions. Similarly, the latch 740 can be in the closed-latch position when the second frame 714 is in the open-frame.

To releasably couple the latch 740 to the second frame 714, the latch 740 and the second frame 714 include corresponding retention structures 744A, 744B. For example, in FIG. 8, the latch 740 includes a proximally-sloped bottom surface 744A that engages a distally-sloped top surface 744B of the second frame 714 when the latch 740 is in the closed-latch position and the second frame 714 is in the closed-frame position. The pitch of the sloped surfaces 744A, 744B is configured such that the surface 744A of the latch 740 can release from the surface 744B of the second frame 714 when the latch 740 moves to the open-latch position. Similarly, the pitch of the sloped surfaces 744A, 744B is configured such that the engagement between the surface 744A and the surface 744B prevents rotation of the second frame 714 when the second frame 714 is in the closed-frame position and the latch 740 is in the closed-latch position.

A release lever 746 is coupled to the latch 740 and operable to move the latch 740 from the closed-latch position to the open-latch position. For example, a proximal portion 747 of the release lever 746 can be coupled to a proximal portion 743 of the latch 740 (e.g., via a coupling member such as, for example, a screw or releasable pin). As such, the release lever 746 can be rotationally fixed relative to the latch 740.

The release lever 746 also includes a projection 748 that extends from the release lever 746 towards the second arm 728 of the first frame 712. As shown in FIGS. 8-9, the projection 748 can engage against the second arm 728 of the first frame 712, when the release lever 746 is coupled to the latch 740. In this way, the projection 748 can act as a fulcrum about which the release lever 746 can rotate.

In this arrangement, rotation of the release lever 746 about the projection 748 and towards the second arm 728 causes corresponding rotation of the latch 740 about the second pin 742 and away from the second frame 714. The release lever 746 is thus operable by a user to release the second frame 714 from the latch 740 and the second arm 728 so that the second frame 714 can be moved from the closed-frame position shown in FIG. 7 to the open-frame position shown in FIG. 9.

The latch 740 can be biased towards the closed-latch position by a biasing member. For example, the biasing member can be a spring 750 extending between the second arm 728 and the latch 740 to bias the latch 740 toward the closed-latch position. FIG. 8 shows the spring 750 when the latch 740 is in the closed-latch position and FIG. 9 shows the spring 750 when the latch 740 is in the open-latch position. As shown in FIGS. 8-9, the spring 750 extends between a first surface 752 on a proximal portion of the latch 740 and a second surface 754 on the second arm 728. In an example, the second surface 754 can be a lateral protrusion on the second arm 728. Because the second arm 728 is fixed and the latch 740 is rotatable, the spring 750 applies a biasing force directed from the second arm 728 to the proximal portion of the latch 740. In this arrangement, the spring 750 thus biases the latch 740 to rotate clockwise in FIGS. 8-9 toward the closed-latch position.

As shown in FIG. 10, the first frame 712 further includes a passage 756 extending through the base 730. When the crimping tool head 700 is coupled to the actuator assembly, a portion of the actuator assembly can extend through the passage 756 and couple to the ram 718 in the first frame 712. In this way, the actuator assembly can move distally through the passage 756 to thereby move the ram 718 toward the crimping anvil 720. As one example, the ram 718 can be releasably coupled to the actuator assembly by one or more second coupling members 758 (e.g., a releasable pin or a screw). This can allow for the ram 718 to be replaced and/or repaired, and/or facilitate removably coupling the crimping tool head 700 to the actuator assembly.

The crimping tool head 700 can further include a return spring (such as the return spring 228 illustrated in FIG. 3) configured to bias the ram 718 in the proximal direction towards the retracted position shown in FIGS. 8-9. The return spring can thus cause the ram 718 to return to its retracted position upon completion of a distal stroke of the ram 718 (during a crimping operation).

Figure 11A:
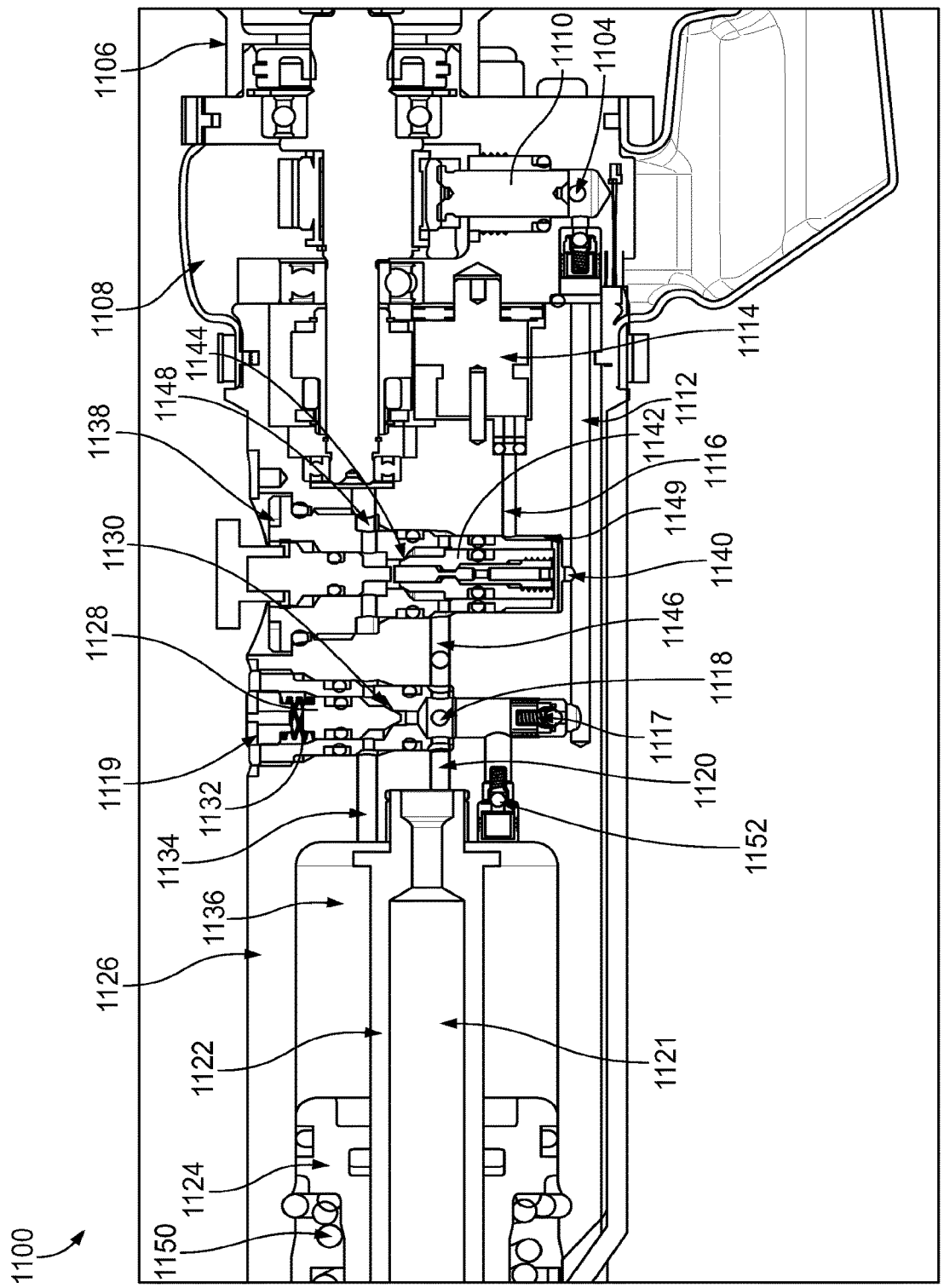
FIG. 11A illustrates a hydraulic circuit that may be used with a hydraulic tool.
Figure 11B:
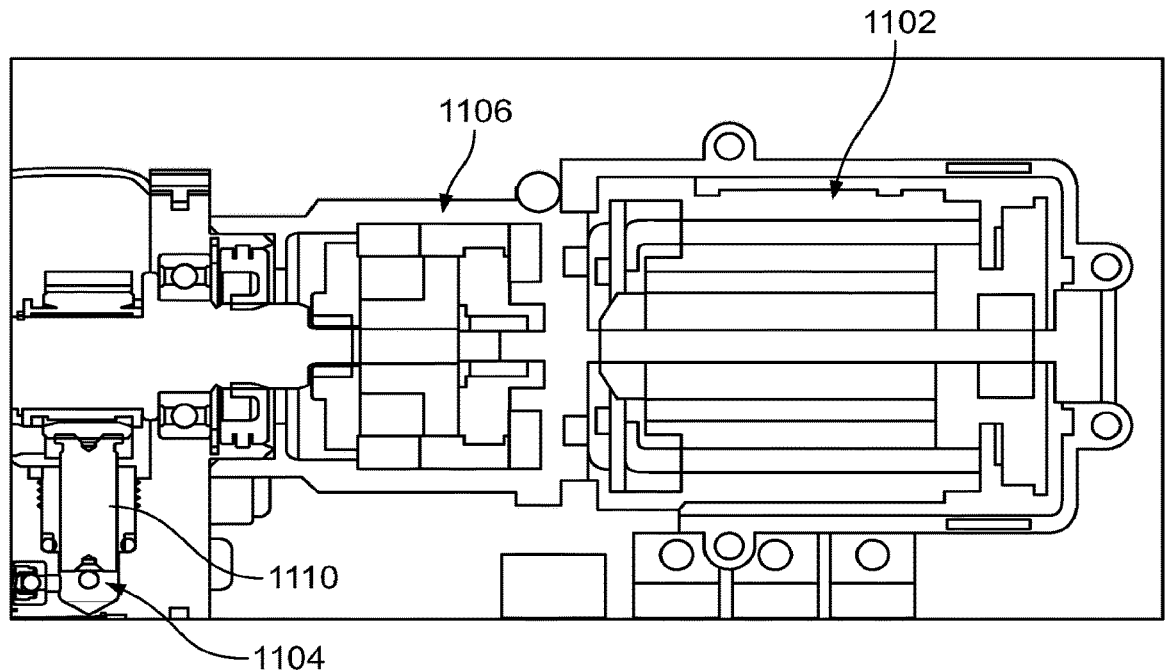
FIG. 11B illustrates a portion of the hydraulic circuit illustrated in FIG. 11A.
Figure 11C:
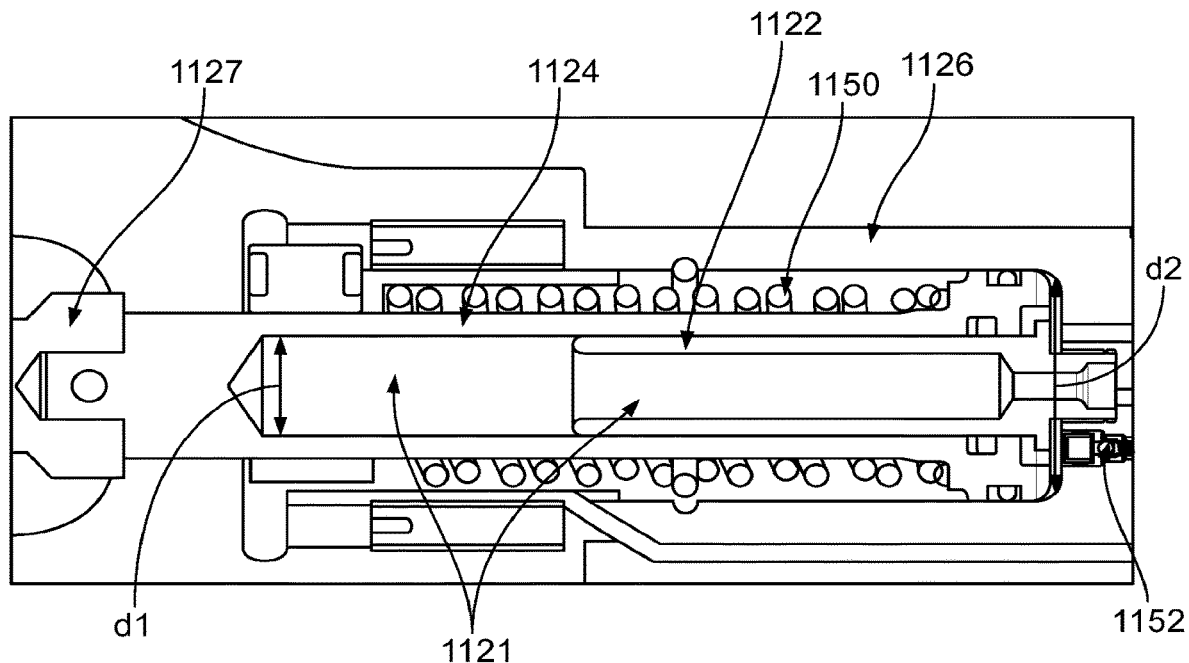
FIG. 11C illustrates a portion of the hydraulic circuit illustrated in FIG. 11A.

FIGS. 11A, 11B, and 11C illustrate a hydraulic circuit 1100, in accordance with an example implementation. Such a hydraulic circuit 1100 may be used with a hydraulic tool, such as the hydraulic crimping tool 100 illustrated in FIG. 1 and/or the hydraulic tool 130 illustrated in FIG. 7.

The hydraulic tool 1100 includes an electric motor 1102 (shown in FIG. 11B) configured to drive a hydraulic pump 1104 via a gear reducer 1106. The hydraulic tool 1100 also includes a reservoir or tank 1108, which operates as reservoir for storing hydraulic oil at a low pressure level (e.g., atmospheric pressure or slightly higher than atmospheric pressure such as 30-70 psi). As the electric motor 1102 rotates in a first rotational direction, a pump piston 1110 reciprocates up and down. As the pump piston 1110 moves upward, fluid is withdrawn from the tank 1108. As the pump piston 1110 moves down, the withdrawn fluid is pressurized and delivered to a pilot pressure rail 1112. As the electric motor 1102 rotates in the first rotational direction, a shear seal valve 1114 remains closed such that a passage 1116 is disconnected from the tank 1108.

The pressurized fluid in the pilot pressure rail 1112 is communicated through a check valve 1117 and a nose 1118 of a sequence valve 1119, through a passage 1120 to a chamber 1121. As shown in FIG. 11C, the chamber 1121 is formed partially within the inner cylinder 1122 and partially within a ram 1124 slidably accommodated within a cylinder 1126. The ram 1124 is configured to slide about an external surface of the inner cylinder 1122 and an inner surface of the cylinder 126. The inner cylinder 1122 is threaded into the cylinder 1126 and is thus immovable. As show in FIG. 11C, the pressurized fluid entering the chamber 1121 applies a pressure on the inner diameter "d1" of the ram 1124, thus causing the ram 1124 to extend (e.g., move to the left in FIG. 11C). A die head 1127 is coupled to the ram 1124 such that extension of the ram 1124 (i.e., motion of the ram 1124 to the left in FIG. 11) within the cylinder 1126 causes a working head of the tool to move toward a working head, such as the crimper head 114 illustrated in FIG. 1.

Referring back to FIG. 11A, the sequence valve 1119 includes a poppet 1128 that is biased toward a seat 1130 via a spring 1132. When a pressure level of the fluid in the pilot pressure rail 1112 exceeds at threshold value set by a spring rate of the spring 1132, the fluid pushes the poppet 1128 against the spring 1132, thus opening a fluid path through passage 1134 to a chamber 1136. The chamber 1136 is defined within the cylinder 1126 between an outer surface of the inner cylinder 1122 and an inner surface of the cylinder 1126. As a result, referring to FIG. 11C, pressurized fluid now acts on the inner diameter "d1" of the ram 1124 as well as the annular area of the ram 1124 around the inner cylinder 1122. As such, pressurized fluid now applies a pressure on an entire diameter "d2" of the ram 1124. This causes the ram 1124 to apply a larger force on an object being crimped.

As illustrated in FIG. 11A, the hydraulic tool 1100 further includes a pilot/shuttle valve 1138. The pressurized fluid in the pilot pressure rail 1112 is communicated through a nose 1140 of the pilot/shuttle valve 1138 and acts on a poppet 1142 to cause the poppet 1142 to be seated at a seat 1144 within the pilot/shuttle valve 1138. As long as the poppet 1142 is seated at the seat 1144, fluid flowing through the check valve 1117 is precluded from flowing through the nose 118 of the sequence valve 1119 and passage 2146 around the poppet 1144 to a tank passage 1148, which is fluidly coupled to the tank 1108. This way, fluid is forced to enter the chamber 1121 via the passage 1120 as described herein.

Further, fluid in the pilot pressure rail 1112 is allowed to flow around the pilot/shuttle valve 1138 through annular area 1149 to the passage 1116. However, as mentioned above, when the shear seal valve 1114 is closed, the passage 1116 is blocked, and fluid communicated to the passage 1116 is precluded from flowing to the tank 1108.

The crimper 1100 includes a pressure sensor (such as pressure sensor 122 FIG. 3) in communication with a controller of the crimper 1100. The pressure sensor is configured to measure a pressure level within the cylinder 1126, and provide information indicative of the measurement to the controller. As long as the measured pressure is below a threshold pressure value, the controller commands the electric motor 1102 to rotate in the first rotational direction. However, once the threshold pressure value is exceeded, the controller commands the electric motor 1102 to stop and reverse its rotational direction to a second rotational direction opposite the first rotational direction. Rotating the electric motor 1102 in the second rotational direction causes the shear seal valve 1114 to open, thus causing a fluid path to form between the pilot pressure rail 1112 through the annular area 1149 and the passage 1116 to the tank 1108. As a result of fluid in the pilot pressure rail 1112 being allowed to flow to the tank 1108 when the shear seal valve 1114 is opened, the pressure level in the pilot pressure rail 1112 decreases.

Figure 12:
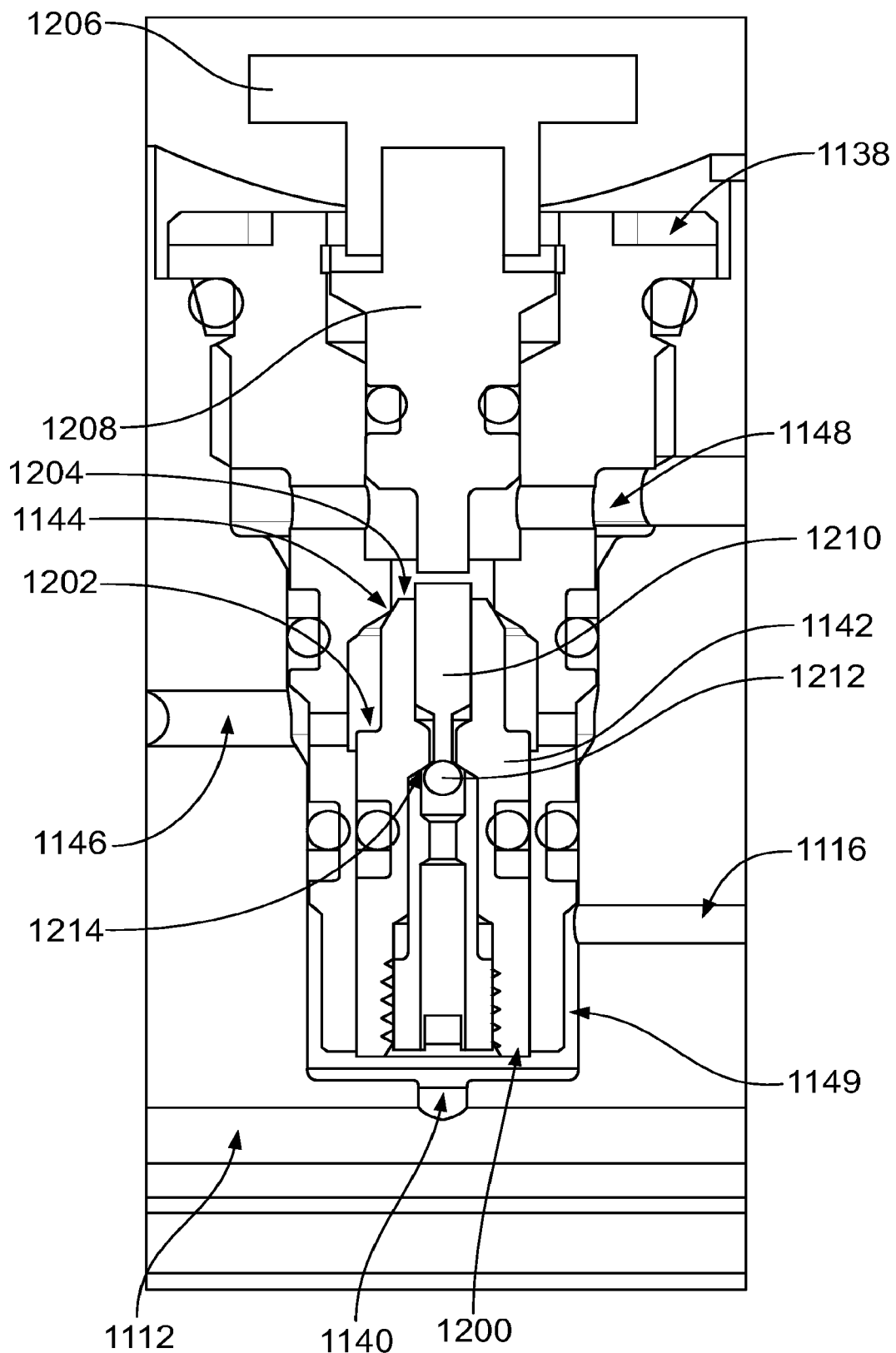
FIG. 12 illustrates a portion of the hydraulic circuit illustrated in FIG. 11A.

FIG. 12 illustrates a close up view of the hydraulic tool 1100 showing the pilot/shuttle valve 1138. Once the pilot pressure rail 1112 is depressurized as a result of the shear seal valve 1114 being opened, pressure level acting at a first end 1200 of the poppet 1142 is decreased. At the same time, pressurized fluid in the chamber 1121 is communicated to the passage 1146 through the nose 1118 of the sequence valve 1119 and acts on a surface area of a flange 1202 of the poppet 1142. As such, the poppet 1142 is unseated (e.g., by being pushed downward).

A return spring 1150 encloses the ram 1124, and the return spring 1150 pushes the ram 1124 (e.g., to the right in FIGS. 11A, 11C). As a result, fluid in the chamber 1121 is forced out of the chamber 1121 through the nose 1118 of the sequence valve 1119 to the passage 1146, then around a nose or second end 1204 of the now unseated poppet 1142 to the tank passage 1148, and ultimately to the tank 1108. Similarly, fluid in the chamber 1136 is forced out of the chamber 1136 through a check valve 1152, through the nose 1118 of the sequence valve 1119 to the passage 1146, then around the nose or second end 1204 of the poppet 1142 to the tank passage 1148, and ultimately to the tank 1108. The check valve 1117 blocks flow back to the pilot pressure rail 1112. Flow of fluid from the chambers 1121 and 1136 to the tank 1108 relieves the chambers 1121 and 1136 causing the ram 1124 to return to a start position, and the crimper 1100 is again ready for another cycle.

In some cases, the shear seal valve 1114 might not operate properly. In these cases, when the electric motor 1102 is commanded to rotate in the second rotational position, the shear seal valve 1114 might not open a path from the passage 1116 to the tank 1108, and pressure level in the pilot pressure rail 1112 is not relieved and remains high. In this case, the poppet 1142 might not be unseated, and fluid in the chambers 1121 and 1136 is not relieved. As such, the ram 1124 might not return to the start position. To relieve the chambers 1121 and 1136 in the case of a failure of the shear seal valve 1114, the hydraulic tool 1100 may be equipped with an emergency relief mechanism that is described herein.

As shown in FIG. 12, a mechanical switch or button 1206 is coupled to a poppet 1208 disposed within the pilot/shuttle valve 1138. In an emergency or failure situation, the button 1206 may be pressed (downward), which causes the poppet 1208 to be pushed further within the pilot/shuttle valve 1138 (e.g., move downward in FIG. 12). As the poppet 1208 moves, it contacts a pin 1210 that is disposed partially within the poppet 1142.

The pin 1210 is in contact with a check ball 1212 disposed within the poppet 1142. The check ball 1212 is seated at a seat 1214 within the poppet 1142 as long as the pilot pressure rail 1112 is pressurized and the poppet 1142 is seated at the seat 1144. However, when the button 1206 is pressed and the poppet 1208 moves downward contacting and pushing the pin 1210 downward, the check ball 1212 is unseated from the seat 1214. As a result, pressurized fluid in the pilot pressure rail 1112 is allowed to flow through the poppet 1142, around the check ball 1212, around the pin 1210 and the poppet 1208 to the tank passage 1148, and ultimately to the tank 1108. This way, the pressure in the pilot pressure rail 1112 is relieved in the case of failure of the shear seal valve 1114 via pressing the button 1206. Relieving pressure in the pilot pressure rail 1112 allows the poppet 1142 to be unseated under pressure of fluid in the passage 1146, thus relieving the chambers 1121 and 1136 as described above.

Advantageously, the configuration illustrated in FIGS. 11 and 12 combines the operation of the emergency relief mechanism with the pilot/shuttle valve 1138 as opposed to including a separate lever mechanism and associated separate valve to allow for relieving pressure in the case of a hydraulic circuit malfunction.

Within some examples, the hydraulic tools 100, 130 can be configured such that the tool head (e.g., the tool head 114, the crimping head 132, the crimping tool head 700, and/or the tool head 1418) is rotationally fixed relative to a frame and/or a gripping portion of a hydraulic tool (e.g., the hydraulic tools 100, 130). In other examples, the tool head can rotate relative to the frame and/or the gripping portion of the hydraulic tool. For instance, as an example, FIG. 20 illustrates a partial cross-sectional view of a hydraulic tool 2000 including a tool head 2014 that can rotate relative to a frame 2001.

Figure 20:
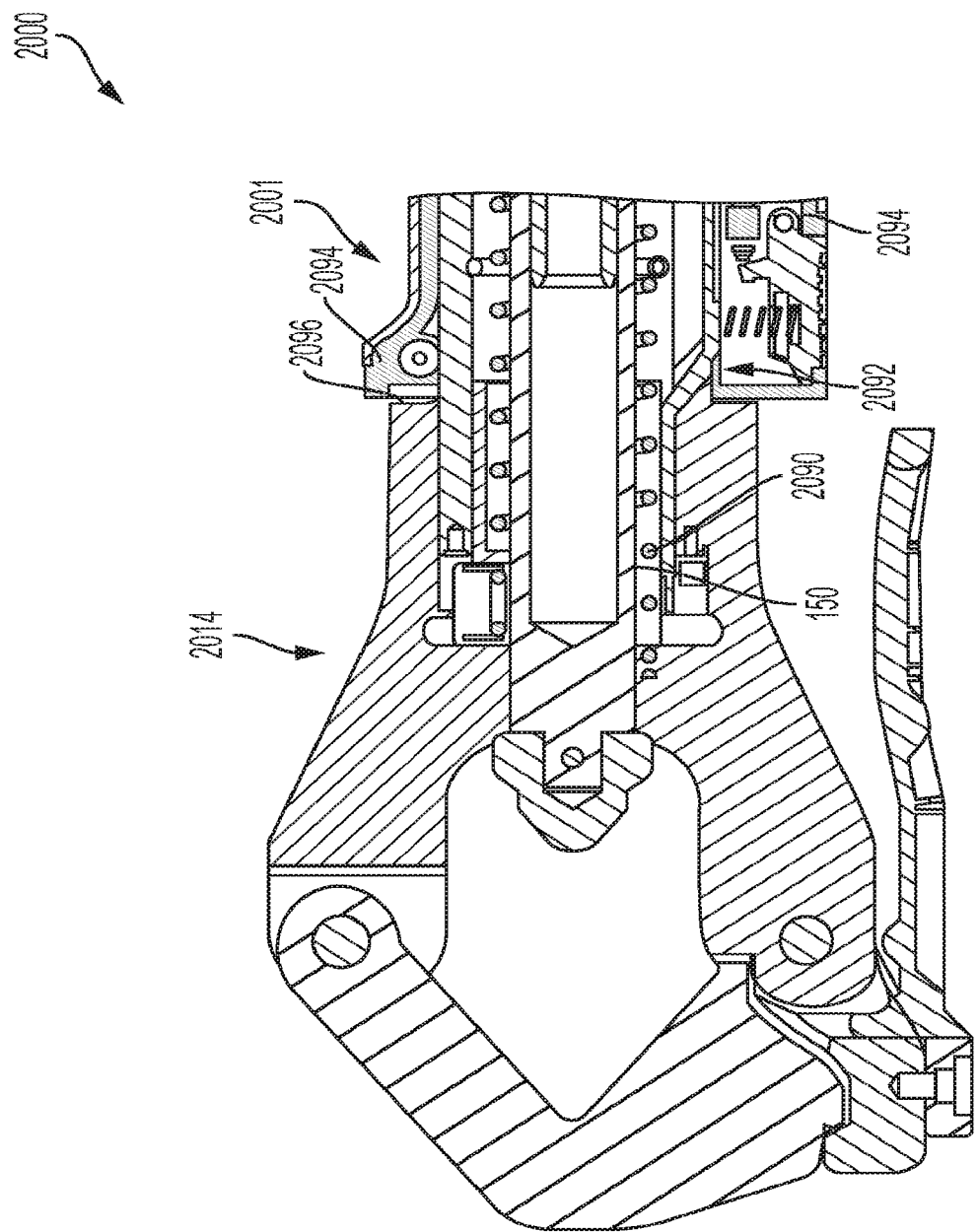
FIG. 20 illustrates a partial cross-sectional view of a hydraulic tool with a rotatable tool head according to an example embodiment.

As shown in FIG. 20, the tool head 2014 includes a first thread 2088A that threadedly engages with a second thread 2088B in the frame 2001.

In this arrangement, the threaded engagement between the first thread 2088A and the second thread 2088B can define the extent to which the tool head 2014 can rotate relative to the frame 2001. As examples, the tool head 2014 can rotate approximately 180 degrees, approximately 270 degrees, approximately 300 degrees, approximately 330 degrees, approximately 350 degrees, or approximately 360 degrees. Rotating the tool head 2014 relative to the frame 2001 can beneficially facilitate operating the hydraulic tool 2000 various operational environments (e.g., tight locations with relatively low clearance for the tool head 2014).

Also, as shown in FIG. 20, the hydraulic tool 2000 includes the linear distance sensor 150 described above. Given that the tool head 2014 rotates relative the frame 2001 along the threaded coupling of the first thread 2088A and the second thread 2088B, the tool head 2014 can move axially relative to the frame 2001 when the tool head 2014 rotates relative to the frame 2001. Within examples, the linear distance sensor 150 can be arranged in the tool head 2014 such that the linear distance sensor 150 moves with the tool head 2014 relative to the frame 2001. For instance, in FIG. 20, the linear distance sensor 150 is floated in a cavity (e.g., the cylindrical bushing 126 shown in FIG. 3) of the tool head 2014 and biased by a spring 2090 into contact with the tool head 2014 as the tool head 2014 translates away from the frame 2001. Stated differently, the spring 2090 biases the linear distance sensor 150 in a direction from the frame 2001 toward the tool head 2014 such that the linear distance sensor 150 maintains a fixed position in the tool head 2014 when the tool head 2014 moves axially during rotation of the tool head 2014 relative to the frame 2001. In this arrangement, the linear distance sensor 150 can accurately sense the linear distance in all rotational alignments between the tool head 2014 and the frame 2001.

In some examples, the tool head 2014 can include one or more wires 2092 that extend from a location internal to the tool head 2014 into the frame 2001. In one example, the wire(s) 2092 can extend from the linear distance sensor 150 in the tool head 2014 and through the frame 2001 to the controller 50 (in FIG. 2). In FIG. 20, the wire(s) 2092 are routed out a proximal end 2096 of the tool head 2014 along a direction substantially parallel to the central axis of the hydraulic tool 200. Further, in FIG. 20, the wire(s) 2092 do not route radially outwardly until the wire(s) 2092 are past the proximal end 2096 of the tool head 2014 and into the frame 2001 (e.g., into a plurality of handle halves 2094 of the frame 2001). This arrangement can allow the tool head 2014 to rotate relative to the frame 2001 without a slip ring contact for the wire(s) 2092. However, in other examples, the hydraulic tool 2000 can include a slip ring contact for electrically coupling to the wire(s) 2092 extending from the tool head 2014.

As described above, the hydraulic tools 100, 130 can be operated based, at least in part, on sensor information provided by the pressure sensor 122 and/or the distance sensor 150 to the controller 50. For instance, among other things, the controller 50 can determine when to stop the motor 102 based on the sensor information provided by the distance sensor 150 and/or the pressure sensor 122. In one implementation, the controller 50 can stop the motor 102 responsive to the controller 50 determining, based on a signal from the pressure sensor 122, that a maximum fluid pressure was sensed by the pressure sensor 122. Additionally or alternatively, the controller 50 can stop the motor 102 responsive to the controller 50 determining, based on a signal from the distance sensor 150, that the piston 200 traveled a certain distance.

According to further example embodiments, a hydraulic tool (such as, e.g., the tools 100, 130 described above) can include additional or alternative sensors, which can provide additional or alternative types of sensor information to facilitate the controller 50 operating the tool 100, 130.

Figure 14:
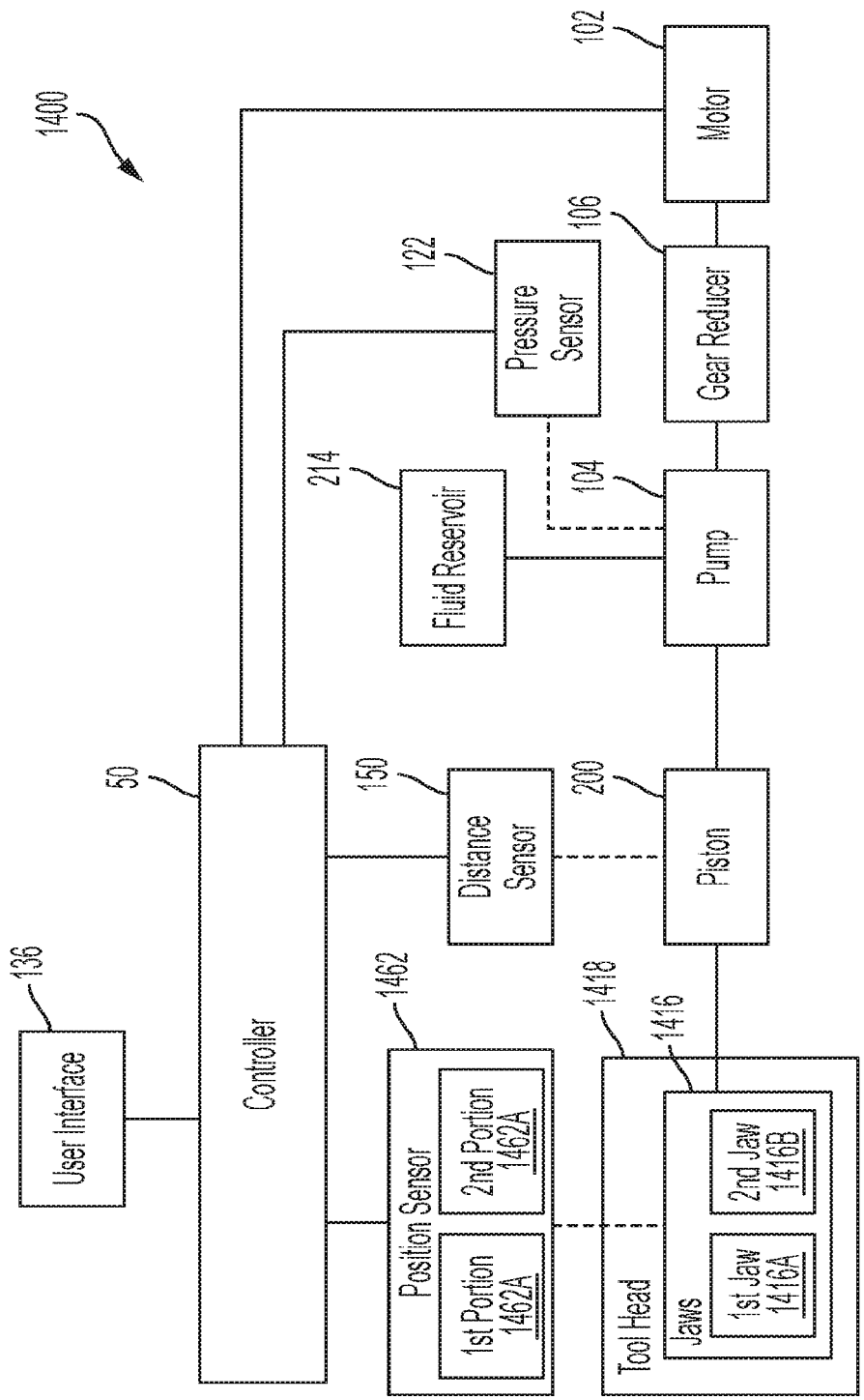
FIG. 14 illustrates a simplified block diagram of a hydraulic tool according to an example embodiment.

As one example, FIG. 14 depicts a simplified block diagram of a hydraulic tool 1400 according to another example embodiment. The hydraulic tool 1400 can include and/or omit any of the components of the hydraulic tool 100 and the hydraulic tool 130 described above. For instance, as shown in FIG. 14, the hydraulic tool 1400 includes the motor 102, the gear reducer 106, the pump 104, the fluid reservoir 214, the pressure sensor 122, the moveable piston 200, the distance sensor 150, the controller 50, and the user interface 136, which can be arranged and operate as described above for the hydraulic tool 100 and/or the hydraulic tool 130 described above.

Also, as shown in FIG. 14, a tool head 1418 has a plurality of jaws 1416, which can move relative to each other to perform work on a workpiece located between the jaws 1416. In FIG. 14, the jaws 1416 include a first jaw 1416A and a second jaw 1416B. However, in other examples, the jaws 1416 can include a greater quantity of jaws 1416.

In one example, the tool head 1418 is in the form of a cutting head. In an implementation of such example, the jaws 1416 can include a first blade and a second blade for cutting a workpiece located between the first blade and the second blade.

In another example, the tool head 1418 is in the form of a crimping head such as, for example, the crimping heads 114, 132, and 700 described above. In one implementation, the tool head 1418 can be a die-less crimping head. For instance, the jaws 1416 can include a ram and an anvil for crimping a workpiece. In another implementation, the tool head 1418 can be a crimping head having a first crimping die and a second crimping die for crimping the workpiece.

Within examples, the jaws 1416 can open and close to perform work on the workpiece such as cutting and/or crimping the workpiece. More specifically, the piston 200 can move at least one of the jaws 1416 towards another of the jaws 1416 until the jaws 1416 reach a closed position. In an example in which the tool head 1418 is a cutting head with a first blade and a second blade, the jaws 1416 can complete a cut of the workpiece when the jaws 1416 are at the closed position. In another example, in which the tool head 1418 is a crimping head, the jaws 1416 can complete a crimp of the workpiece when the jaws 1416 are at the closed position. More generally, the closed position can be a position in which the jaws 1416 are at a minimum distance relative to each other. In one embodiment, the closed position is indicated by the pressure exceeding a predetermined upper pressure. In another embodiment, the closed position is indicated by the motor current exceeding a predetermined upper current. In another embodiment, the closed position is at a distance between the jaws suitable for achieving a good crimp based on the type and size of the workpiece.

As shown in FIG. 14, the hydraulic tool 1400 further includes a position sensor 1462 coupled to the tool head 1418 and in communication with the controller 50. The position sensor 1462 can detect when the jaws 1416 are at the closed position and responsively generate a sensor signal indicating to the controller 50 that the jaws 1416 are at the closed position. As examples, the position sensor 1462 can include a contact switch (e.g., a momentary spring-biased switch), a magnetic switch (e.g., a reed switch), a Hall-Effect sensor, and/or a piezoelectric device. Additionally, for instance, the position sensor 1462 can include a normally-closed and/or a normally-open switch.

Within examples, the position sensor 1462 can include a first sensor portion 1462A and a second sensor portion 1462B, which can interact with the first sensor portion 1462A in a fixed and consistent manner when the jaws 1416 are in the closed position. For instance, in some examples, the first sensor portion 1462A and the second sensor portion 1462B can be configured to physically contact each other when the jaws 1416 are in the closed position, and be physically spaced apart from each other when the jaws 1416 are not in the closed position. In other examples, the first sensor portion 1462A and the second sensor portion 1462B can always be at a specific distance from each other when the jaws 1416 are in the closed position, and at other distances from each other when the jaws 1416 are not in the closed position.

More generally, the position sensor 1462 can be arranged with the tool head 1418 such that (i) the first sensor portion 1462A and the second sensor portion 1462B are only at a predetermined location relative to each other (e.g., in contact or at a specific distance) when the jaws 1416 are in the closed position, and (ii) the interaction between the first sensor portion 1462A and the second sensor portion 1462B at the predetermined location causes the position sensor 1462 to provide the sensor signal to the controller 50 indicating that the jaws 1416 are at the closed position.

Within examples, a first part of the tool head 1418 can include the first sensor portion 1462A and a second part of the tool head 1418 can include the second sensor portion 1462B. The first part of the tool head 1418 and the second part of the tool head 1418 can move relative to each other such that the first sensor portion 1462A and the second sensor portion 1462B are (i) at the predetermined location relative to each other when the jaws 1416 are in the closed position and (ii) at other locations relative to each other when the jaws 1416 are not at the closed position.

For instance, in an example, the first jaw 1416A can include the first sensor portion 1462A and the second jaw 1416B can include the second sensor portion 1462B. In another example, one of the jaws 1416 can include the first sensor portion 1462A, and a frame or another stationary feature of the tool head 1418 can include the second sensor portion 1462B.

In one implementation, the first sensor portion 1462A can include a contact switch (e.g., a momentary spring-biased switch), which the second sensor portion 1462B actuates when the jaws 1416 are in the closed position. In another implementation, the first sensor portion 1462A can include a magnetic switch and/or Hall-Effect sensor. The second sensor portion 1462B can include a magnetic element, which applies a magnetic field of threshold-strong strength to the first sensor portion 1462A when the magnetic element is at the predetermined location relative to the first sensor portion 1462A. Responsive to the first sensor portion 1462A sensing the threshold-strong strength, the first sensor portion 1462A transmits the sensor signal to the controller 50.

In yet another implementation, the first sensor portion 1462A and the second sensor portion 1462B can be conductors that contact each other to form a completed circuit. For instance, the first jaw 1416A can include the first sensor portion 1462A and the second jaw 1416B can include the second sensor portion 1462B. In this arrangement, when the first jaw 1416A contacts the second jaw 1416B, the position sensor 1462 can detect an electrical signal (e.g., a change in current, an inductance, and/or resistance) due the conductive coupling of the first jaw 1416A and the second jaw 1416B.

As noted above, the controller 50 can receive the sensor signal from the position sensor 1462 and, based on the sensor signal, determine when the jaws 1416 are in the closed position. Accordingly, whereas the controller 50 can infer that the jaws 1416 are in the closed position based on the sensor information provided by the pressure sensor 122 and/or the distance sensor 150, the controller 50 can directly determine when the jaws 1416 are in the closed position from the sensor information provided by the position sensor 1462. Accordingly, the controller 50 can directly determine that a crimp or a cut of a workpiece by the jaws 1416 has been completed based on the sensor information provided by the position sensor 1462.

Within examples, the controller 50 can operate the motor 102 based, at least in part, on the sensor signal received from the position sensor 1462. For instance, during a crimping operation and/or a cutting operation, the controller 50 can cause the motor 102 to run so as to close the jaws 1416 until the controller 50 receives the sensor signal from the position sensor 1462 indicating that the jaws 1416 are in the closed position. Responsive to the controller 50 receiving the sensor signal from the position sensor 1462 indicating that the jaws 1416 are in the closed position, the controller 50 can cause the motor 102 to stop. The controller 50 can then run the motor 102 to open jaws 1416 so that a next crimping operation and/or a next cutting operation can be performed by the hydraulic tool 1400.

By stopping the motor 102 responsive to the position sensor 1462 indicating that the jaws 1416 are in the closed position, the controller 50 can beneficially stop the motor 102 more rapidly than in examples in which the controller 50 stops the motor based on the pressure sensor 1422 detecting a maximum pressure (which may not occur until after the jaws 1416 reach the closed position). This can thus provide for greater operational efficiencies and/or less wear on the components of the hydraulic tool 1400 (e.g., the motor 102, the gear reducer 106, the pump 104, and/or the piston 108).

In an additional or alternative example, the process 300 described and illustrated with respect to FIG. 5 can be modified such that the controller 50 determines when to stop the motor at block 370 based on sensor information provided by the position sensor 1462 instead of and/or in addition to the sensor information provided by the pressure sensor 122 and/or the distance sensor 150.

Figure 15:
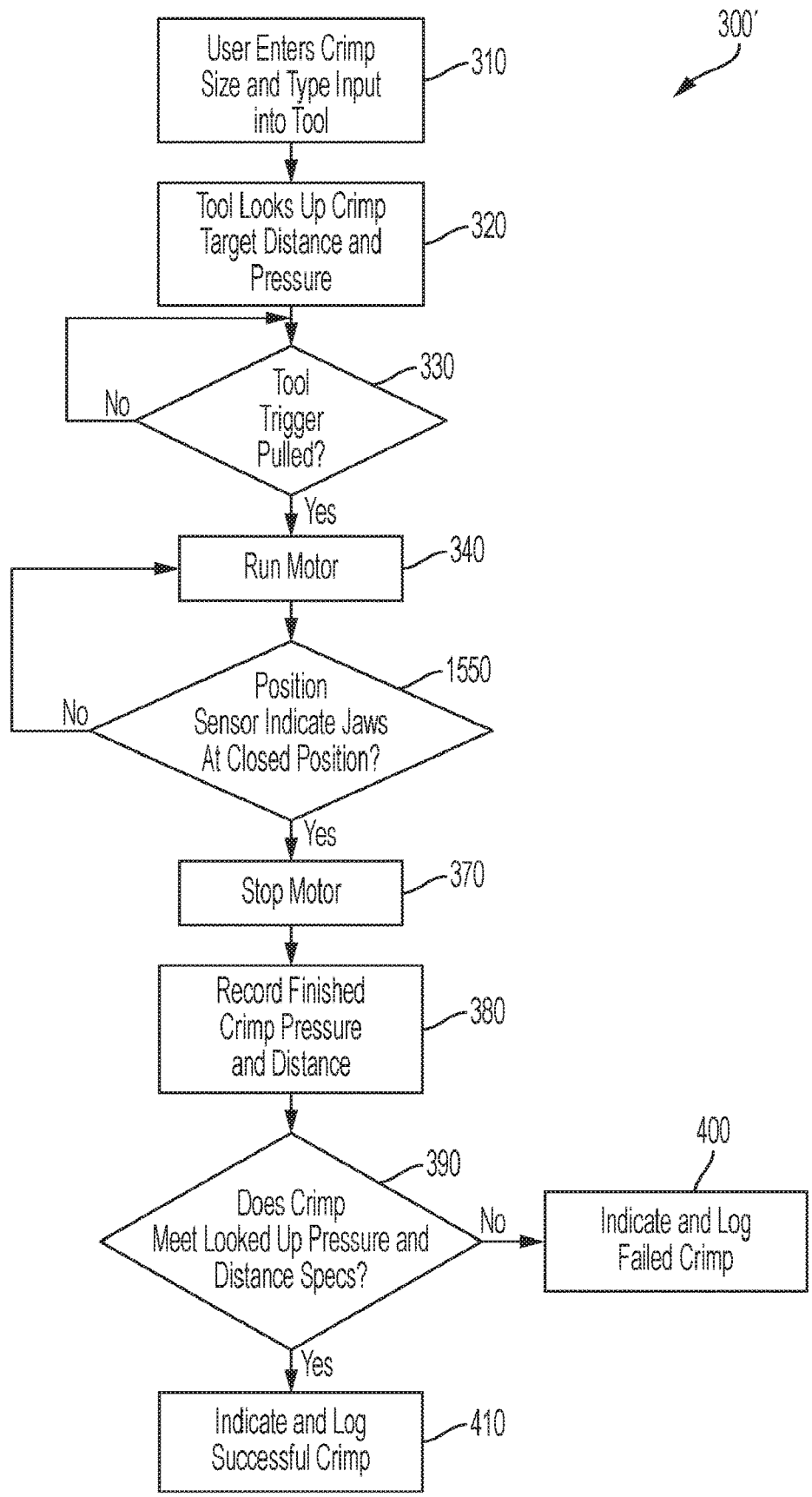
FIG. 15 illustrates a flowchart of an example method utilizing a hydraulic tool, according to an example embodiment.

A flowchart for a process 300' in accordance with one implementation of such an example is depicted in FIG. 15. As shown in FIG. 15, the process 300' is substantially the same as the process 300 shown in FIG. 5, except the steps at blocks 350 and 360 are replaced with a step at block 1550. At block 1550, the process 300' includes determining whether the position sensor 1462 has indicated that the jaws 1416 are in the closed position. If the position sensor 1462 has not indicated that the jaws 1416 are in the closed position at block 1550, then the process 300' can return to block 340. Whereas, if the position sensor 1462 has indicated that the jaws 1416 are in the closed position at block 1550, then the process can proceed to block 370.

Also, in an additional or alternative example, the process 500 described and illustrated with respect to FIG. 6 can be modified such that the controller 50 determines when to stop the motor at block 590 based on sensor information provided by the position sensor instead of and/or in addition to the sensor information provided by the pressure sensor 122 and/or the distance sensor 150.

Figure 16:
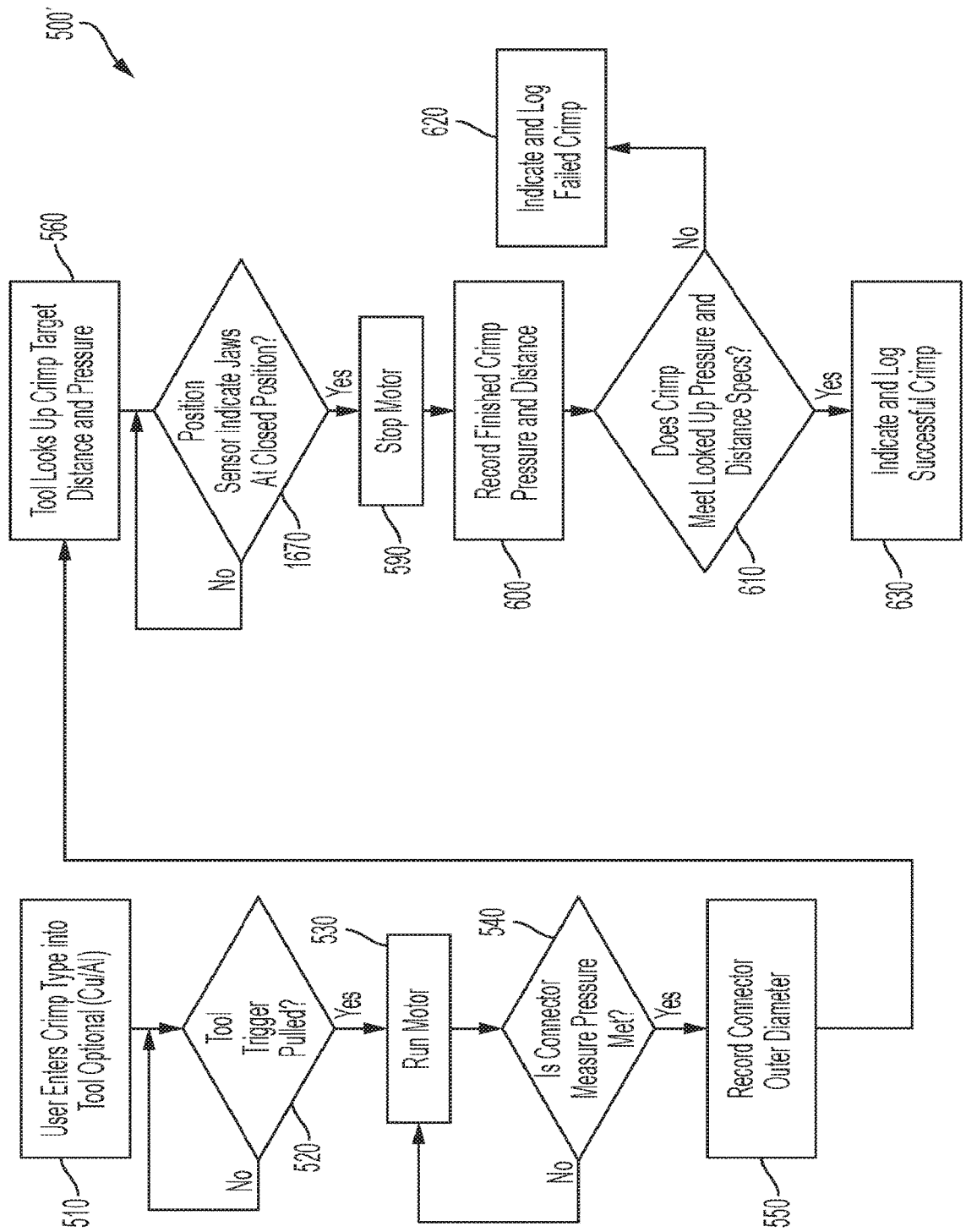
FIG. 16 illustrates a flowchart of an example method utilizing a hydraulic tool, according to an example embodiment.

A flowchart for a process 500' in accordance with one implementation of such an example is depicted in FIG. 16. As shown in FIG. 16, the process 500' is substantially the same as the process 500 shown in FIG. 6, except the steps at blocks 570 and 580 are replaced with a step at block 1670. At block 1670, the process 500' includes determining whether the position sensor 1462 has indicated that the jaws 1416 are in the closed position. If the position sensor 1462 has not indicated that the jaws 1416 are in the closed position at block 1670, then the process 500' can return to start of block 1670. Whereas, if the position sensor 1462 has indicated that the jaws 1416 are in the closed position at block 1670, then the process can proceed to block 590.

In additional or alternative examples, the controller 50 can operate the motor 102 based, at least in part, on the sensor information provided by the position sensor 1462 to partially retract the piston 200 while performing work on a plurality of similar workpieces. In such examples, responsive to the position sensor 1462 indicating that the jaws 1416 are in the closed position, the controller 50 operates the motor 102 to pull back the piston 200 to the partially retracted position. The partially retracted position of the piston 200 can be a position at which an opening between the jaws 1416 is slightly larger than a circumference of the workpieces. As the piston 200 does not fully retract before initiating a crimp and/or cut of the next workpiece, the hydraulic tool 1400 can more rapidly complete work on a plurality of similar workpieces.

Figure 17:
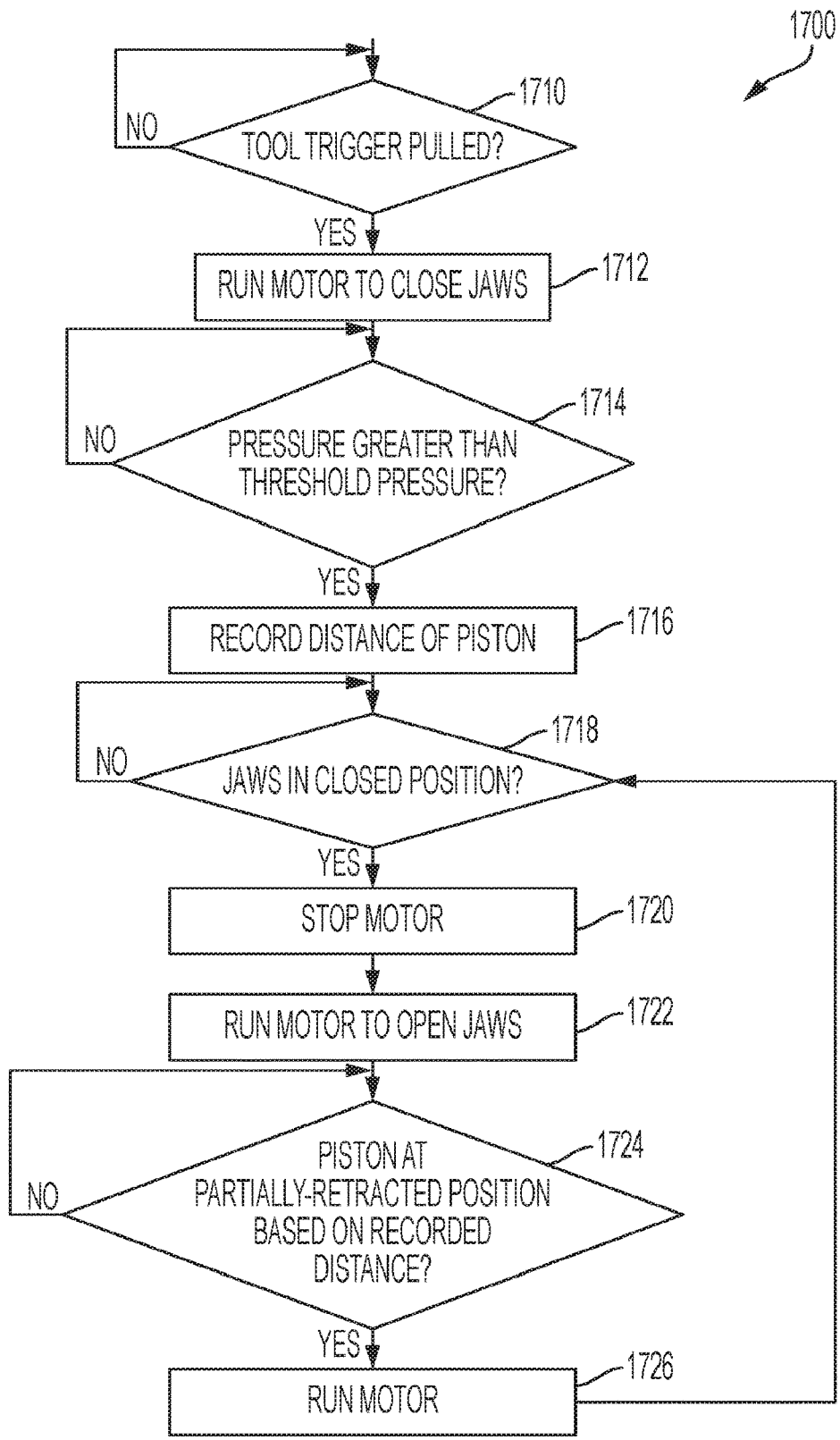
FIG. 17 illustrates a flowchart of an example method utilizing a hydraulic tool, according to an example embodiment.

FIG. 17 depicts a flowchart for a method 1700 for using the hydraulic tool 1400 to perform work on a plurality of similar workpieces, according to an example embodiment. As shown in FIG. 17, at block 1710, the method 1500 includes determining whether a tool trigger (e.g., the tool trigger 138 in FIG. 7) has been pulled. If it is determined at block 1710 that the tool trigger has not been pulled, then the method 1700 returns to the start of block 1710.

If it is determined at block 1710 that the tool trigger has been pulled, then a crimping and/or cutting action commences. That is, the method 1700 proceeds to block 1712 at which the controller 50 initiates activation of the motor 102. After the motor 102 has been activated at block 1712, the pressure sensor 122 senses the pressure of the fluid, which begins to increase as the piston 200 moves and the jaws 1416 close.

At block 1714, the method 1700 includes determining, based on the sensor information provided by the pressure sensor 122, whether the pressure of the fluid is greater than a threshold. The threshold can relate to an amount of pressure indicating that the jaws 1416 first contacted the workpiece (i.e., contacted an outer surface of the workpiece).

If it is determined at block 1714 that the pressure is not greater than the threshold, then the method 1700 returns to the start of block 1714. If it is determined at block 1714 that the pressure is greater than the threshold, then the method 1700 proceeds to block 1716 at which a distance of the piston 200 sensed by the distance sensor 150 is recorded in the memory. Specifically, the distance recorded at block 1716 can relate to the position of the piston 200 at the point at which the pressure sensor 122 sensed the pressure greater than the threshold. In this way, the controller 50 can determine an indication of the circumference of the workpiece as described above.

At block 1718, the method 1700 includes determining whether the jaws 1416 are in the closed position based on the sensor signal provided from the position sensor 1462 to the controller 50. If it is determined that the jaws 1416 are not in the closed position at block 1718, then the method 1700 returns to the start of block 1718. If it is determined that the jaws 1416 are in the closed position based on the sensor signal provided by the position sensor 1462 at block 1718, then the controller 50 stops the motor 102 at block 1720. Additionally, the controller 50 can determine that the crimping and/or cutting action was completed responsive to the position sensor 1462 indicating that the jaws 1416 are in the closed position.

At block 1722, the controller 50 operates the motor 102 to open the jaws 1416 at block 1716. At block 1724, the method 1700 includes determining whether the piston 200 is at the partially retracted position, which is based on the distance recorded at block 1716. The partially retracted position is reached by the piston 200 prior to reaching the fully retracted position of the piston 200 (e.g., the home position of the piston 200). Specifically, the partially retracted position can provide for the jaws 1416 opening to an extent, which allows for a next workpiece to be positioned between the jaws 1416 without fully retracting the piston 200. This can be achieved by moving the piston 200 to a position slightly past the position at which the controller 50 determined that the jaws 1416 first contacted the workpiece (i.e., at block 1714). As the piston 200 does not fully retract before initiating a crimp and/or cut of the next workpiece, the hydraulic tool 1400 can more rapidly operate on a plurality of similar workpieces.

At block 1726, the method 1700 includes running the motor to carry out the next crimp and/or cut of the next workpiece. The process then returns to block 1718 and repeats.

In an additional or alternative example, the controller 50 can receive the sensor signal from the position sensor 1462 indicating that the jaws 1416 are at the closed position, and responsively provide an output to an operator to indicate that a cutting and/or crimping operation is completed. In one implementation, this can beneficially facilitate a remote cutting operation by the hydraulic tool 1400.

In examples, electrical equipment may be maintained while operating at high voltages. An example maintenance operation may involve cutting a live line. In this example, it may be desirable to perform a cable cutting operation by way of a remotely controlled cutting tool so as to insulate workers from electrical hazards.

In other examples, the line might not be easily reachable. For instance, the cable may be in an underwater environment, and may thus be cut via remote control of the cutting tool.

Figure 18:
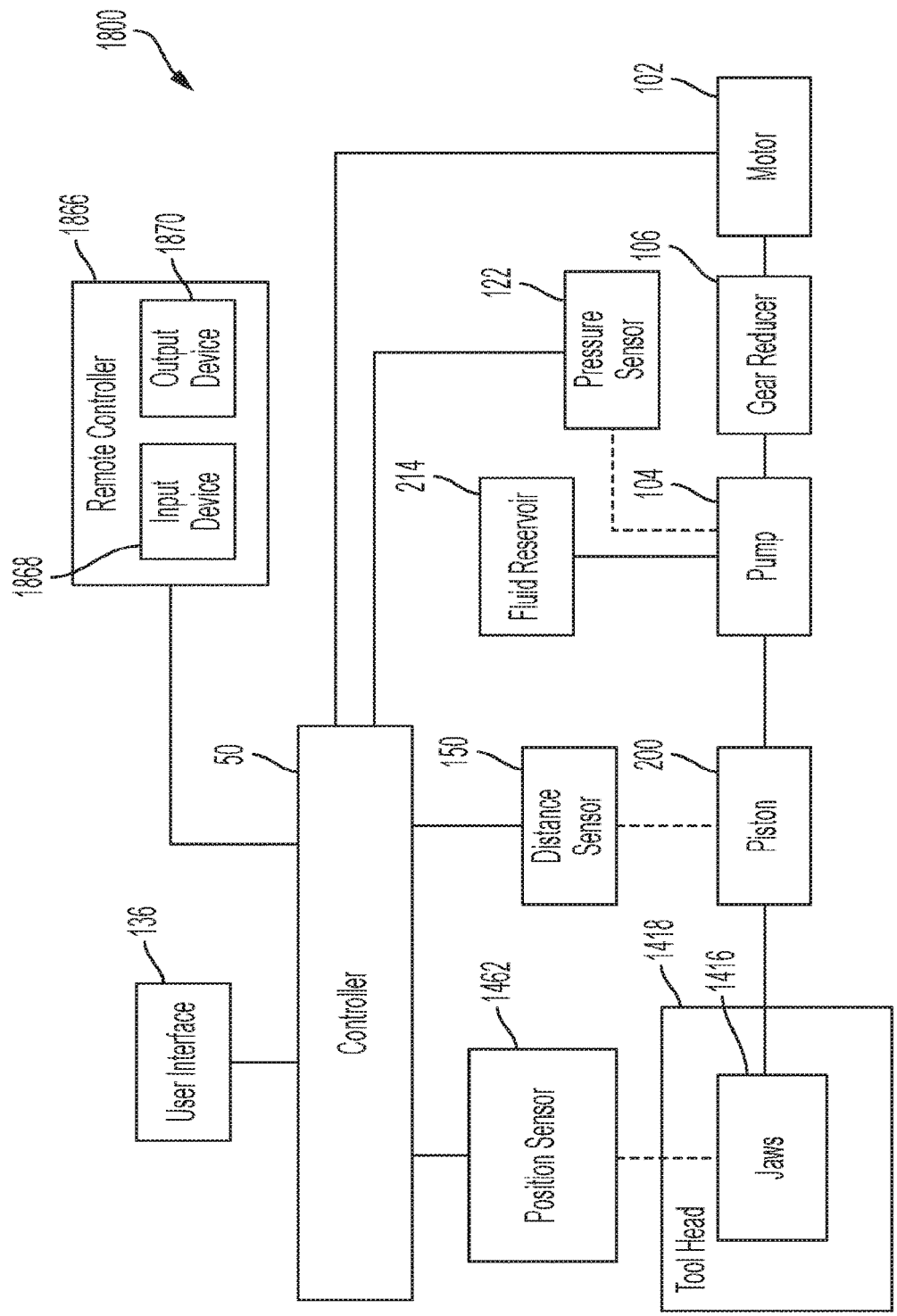
FIG. 18 illustrates a simplified block diagram of a hydraulic tool according to an example embodiment.

FIG. 18 depicts a simplified block diagram of a remotely-controlled hydraulic tool 1800 according to another example embodiment. As shown in FIG. 18, the hydraulic tool 1800 is substantially the same as the hydraulic tools 100, 130, 1400 described above. For example, as described above, the hydraulic tool 1800 includes the motor 102, the gear reducer 106, the pump 104, the fluid reservoir 214, the pressure sensor 122, the moveable piston 200, the distance sensor 150, the controller 50, the user interface 136, the jaws 1416, and the position sensor 1462, which can be arranged and operate as described above for the hydraulic tool 1400, the hydraulic tool 100 and/or the hydraulic tool 130 described above.

Additionally, as shown in FIG. 18, the hydraulic tool 1800 includes a remote controller 1866 in communication with the controller 50. The remote controller 1866 includes a user input device 1868, which is actuatable to provide a trigger signal from the remote controller 1866 to the controller 50 to cause the motor 102 to move the piston 200 and thereby move the jaws 1416 toward the closed position. In this way, the user input device 1868 is actuatable to initiate a cutting operation at a safe distance away from the tool head 1418 and/or the workpiece (e.g., a live wire or cable).

The remote controller 1866 also includes an output device 1870. The output device 1870 is also in communication with the controller 50. The controller 50 can transmit a signal to the output device 1870 to indicate when the cutting operation is completed. Specifically, the controller 50 can (i) receive the sensor signal from the position sensor 1462, (ii) determine that the jaws 1416 are in the closed position based on the sensor signal, and (iii) responsive to determining that the jaws 1416 are in the closed position, transmit the signal to the output device 1870 to indicate that the jaws 1416 are in the closed position and the cutting operation is completed.

Within examples, the output device 1870 can be configured to provide the user with a visual indication and/or an auditory indication that the jaws 1416 are in the closed position and/or the cutting operation is completed. For instance, the output device 1870 can include an indicator light, a display screen, and/or a speaker to provide the indication(s) to the user.

As noted above, the position sensor 1416 can directly indicate that the jaws 1416 reached the closed position and, thus, the position sensor 1416 can provide a reliable indication that the cutting operation was completed. Accordingly, in an environment in which live wires are to be cut, the indication provided to the user based on sensor information sensed by the position sensor 1416 can beneficially facilitate safe operation of the hydraulic tool 1800 at remote distances.

Figure 19:
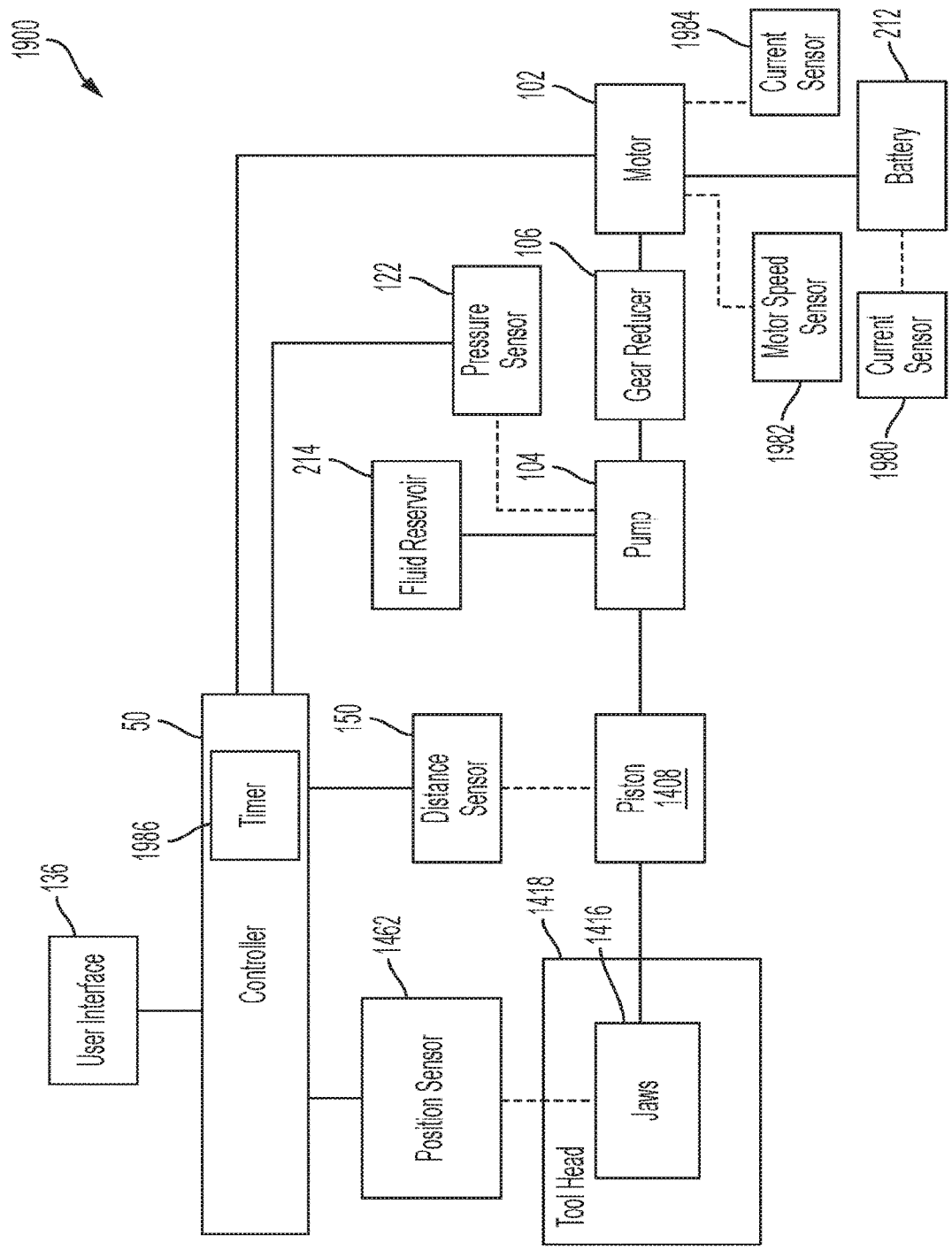
FIG. 19 illustrates a simplified block diagram of a hydraulic tool according to an example embodiment.

Referring now to FIG. 19, a simplified block diagram of a hydraulic tool 1900 is depicted according to another example embodiment. As shown in FIG. 19, the hydraulic tool 1900 is substantially the same as the hydraulic tools 100, 130, 1400, 1800 described above. For example, as described above, the hydraulic tool 1900 includes the motor 102, the gear reducer 106, the pump 104, the fluid reservoir 214, the pressure sensor 122, the moveable piston 200, the distance sensor 150, the controller 50, the user interface 136, the battery 212, the jaws 1416, and the position sensor 1462, which can be arranged and operate as described above for the hydraulic tool 1400, the hydraulic tool 1800, the hydraulic tool 100 and/or the hydraulic tool 130 described above.

Additionally, as shown in FIG. 19, the hydraulic tool 1900 includes a plurality of additional sensors 1980, 1982, 1984, 1986, 1988 in communication with the controller 50 and configured to sense various conditions associated with operation of the hydraulic tool 1900 during a crimping operation. In particular, the hydraulic tool 1900 includes a first current sensor 1980, which is operable to sense a current draw at the battery 212. The hydraulic tool 1900 also includes a motor speed sensor 1982, which is operable to sense a speed at which the motor 102 is operating. The hydraulic tool 1900 further includes a second current sensor 1984, which is operable to sense a current draw at the motor 102. Additionally, the hydraulic tool 1900 includes a timer 1986, which is operable to sense and indicate time during operation of the hydraulic tool 1900. The hydraulic tool 1900 can also include a strain gauge 1988, which is operable to sense a force imparted by at least one jaw 1416 on at least one other jaw 1416.

In this arrangement, the controller 50 can receive, over a stroke of the piston 200, sensor information from the pressure sensor 122, the distance sensor 150, the position sensor 1462, the first current sensor 1980, the motor speed sensor 1982, the second current sensor 1984, the timer 1986, and/or the strain gauge 1988. Based on the received sensor information, the controller 50 can determine a crimp profile over the stroke of the piston 200.

For example, for a particular type of connector, the pressure sensed by the pressure sensor 122 has a particular shape over the distance of the piston 200 stroke sensed by the distance sensor 150 and/or the time sensed by the timer 1986. Additionally or alternatively, for example, the motor speed sensed by the motor speed sensor 1982, the current draw sensed by the first current senor 1980, and/or the current draw sensed by the second current sensor 1984 each have a respective shape over the distance sensed by the distance sensor 150 and/or the time sensed by the timer 1986.

Based on the crimp profile(s) determined by the controller 50, the controller 50 can determine at least one characteristic of a crimp performed on a workpiece. As examples, the characteristic(s) of the crimp performed on the workpiece can include (i) an identification of an event during a stoke of the piston 200, (ii) an identification of a type of connector for the workpiece on which the crimp was performed, and/or (iii) a determination as to whether the crimp was successfully or unsuccessfully performed on the workpiece.

As examples, based on the crimp profile(s), the controller 50 can determine, for instance, a time and/or a distance of the piston 200 at which the following events occur during a stoke: initiation of the crimp stroke, a first contact with the workpiece, a fluid pressure at the first contact with the work piece, a current draw at the battery and/or the motor at the first contact with the workpiece, a minimum fluid pressure sensed during the stroke, a maximum fluid pressure sensed during the stroke, a duration of the stroke, a rate of change of the current draw, a rate of change of the fluid pressure, the jaws 1416 reached the closed position, a fluid pressure when the jaws 1416 reached the closed position, and/or a current draw when the jaws 1416 reach the closed position. Other example events are also possible.

As noted above, the controller 50 can additionally or alternatively determine the connecter type based on the crimp profile(s). For example, the controller 50 can store in the memory 80 data relating to a plurality of reference crimp profiles that are each expected for a respective one of a plurality of different types of connectors. In this example, the controller 50 can perform a comparison of the crimp profile(s) determined by the controller 50 based on the sensor information received during the stroke to the reference crimp profile stored in the memory 80. Based on the comparison, the controller 50 can determine that a particular reference crimp profile matches the crimp profile determined based on the sensor information during the stroke (e.g., based on a confidence score and/or best-fit analysis). The controller 50 can then determine that the workpiece was a particular type of connector associated with the matching reference crimp profile in the memory 80.

In an additional or alternative example, prior to crimping the workpiece, the controller 50 can receive information related to a desired crimp and/or a type of connector for the workpiece via the user interface 136 (e.g., as described above with respect to block 310 of FIG. 5). Based on the entered information, the controller 50 can determine one or more reference crimp profiles (e.g., by looking up the reference crimp profile(s) in the memory 80). Then during and/or after the crimping operation, the controller 50 can compare the crimp profile(s) determined by the controller 50 based on the sensor information received during the stroke to the reference crimp profile(s). Based on the comparison, the controller 50 can identify one or more events that occurred during the stroke and/or whether the crimping operation was successful.

In some examples, the controller 50 can determine whether the crimping operation was successful or unsuccessful based on whether and to what extent the crimp profile(s) determined based on the sensor information match the reference(s) crimp profiles determined based on the user input. Specifically, the controller 50 can determine that the crimping operation was successful when the crimp profile(s) determined based on the sensor information match the reference crimp profile(s) (and/or are within a threshold tolerance range of each other over the stroke). Whereas, the controller 50 can determine that the crimping operation was unsuccessful when the crimp profile(s) do not match the reference(s) crimp profile(s) (and/or are outside the threshold tolerance range of each other over the stroke).

In other examples, the controller 50 can additionally or alternatively determine a quality of crimp indicator by comparing the sensor information with one or more threshold values. For instance, in one example, the pressure sensor 122 can provide to the controller 50 the sensor information indicative of a sensed pressure of the fluid when the ram 208, 718, 1124 is extended to a target location and/or extended by a target distance from a retracted position (e.g., as measured by the linear distance sensor 150). The controller 50 can then compare the sensed pressure to a predetermined threshold pressure level. If the controller 50 determines that the sensed pressure is less than the predetermined threshold pressure level, the controller 50 can indicate that the crimp was bad. Otherwise, if the controller 50 determines that the sensed pressure is approximately equal to or greater than the predetermined threshold pressure level, the controller 50 can indicate that the crimp was good.

In another example, the current sensor 1980 can provide to the controller 50 the sensor information indicative of a sensed current drawn by the hydraulic tool 1400 from the battery 212 when the ram 208, 718, 1124 is extended to the target location and/or extended by the target distance (e.g., as measured by the linear distance sensor 150). The controller 50 can then compare the sensed current to a predetermined threshold current level. If the controller 50 determines that the sensed current is less than the predetermined threshold current level, the controller 50 can indicate that the crimp was bad. Otherwise, if the controller 50 determines that the sensed current is approximately equal to or greater than the predetermined threshold current level, the controller 50 can indicate that the crimp was good.

In another example, the linear distance sensor 150 and the timer 1986 can provide to the controller 50 the sensor information indicative of a sensed velocity and/or a sensed acceleration of the ram 208, 718, 1124 when the ram 208, 718, 1124 is extended to the target location and/or extended by the target distance (e.g., as measured by the linear distance sensor 150). The controller 50 can then compare the sensed velocity and/or sensed acceleration to a predetermined threshold velocity level and/or a predetermined threshold acceleration level. If the controller 50 determines that the sensed velocity and/or the sensed acceleration are less than the predetermined threshold velocity level and/or the predetermined threshold acceleration level, respectively, the controller 50 can indicate that the crimp was bad. Otherwise, the controller 50 can indicate that the crimp was good.

In another example, the motor speed sensor 1982 (e.g., a Hall-Effect sensor) can provide to the controller 50 the sensor information indicative of a sensed rotational speed of the motor 102 when the ram 208, 718, 1124 is extended to the target location and/or extended by the target distance (e.g., as measured by the linear distance sensor 150). The controller 50 can then compare the sensed rotational speed to a predetermined threshold speed level. If the controller 50 determines that the sensed rotational speed is less than the predetermined threshold speed level, the controller 50 can indicate that the crimp was bad. Otherwise, if the controller 50 determines that the sensed rotational speed is approximately equal to or greater than the predetermined threshold speed level, the controller 50 can indicate that the crimp was good.

In another example, the strain gauge 1988 can provide to the controller 50 the sensor information indicative of a sensed strain on the jaws 1416 when the ram 208, 718, 1124 is extended to the target location and/or extended by the target distance (e.g., as measured by the linear distance sensor 150). The controller 50 can then compare the sensed strain to a predetermined threshold strain level. If the controller 50 determines that the sensed strain is less than the predetermined threshold strain level, the controller 50 can indicate that the crimp was bad. Otherwise, if the controller 50 determines that the sensed strain is approximately equal to or greater than the predetermined threshold strain level, the controller 50 can indicate that the crimp was good.

As described above, the controller 50 can determine the crimp quality indicator based on a comparison of the sensor information with one or more threshold values. In the examples described above, the controller 50 can compare a sensed value with a predetermined threshold value. In some implementations, the predetermined threshold value can be a single value. In other implementations, one or more of the predetermined threshold values can be a range of threshold values such that the comparison involves determining whether the sensed value falls in or out of the range of threshold values.

Also, in the examples described above, the controller 50 determines the crimp quality indicator based on sensor information corresponding to conditions existing at the time when the ram 208, 718, 1124 is extended to the target location and/or extended by the target distance. However, in other examples, the controller 50 can additionally or alternatively determine the crimp quality indicator based on sensor information corresponding to conditions existing other times. For instance, in one implementation, the controller 50 can determine a crimp quality indicator based on sensor information corresponding to conditions existing at a moment when the tool head 1418 deforms the connector (e.g., while applying a pressure to the connector that is less than approximately 400 pounds per square inch).

In another implementation, for instance, the controller 50 can determine a crimp quality indicator based on sensor information corresponding to conditions existing prior to the tool head 1418 deforming the connector (e.g., a sensed distance and a sensed pressure at a low-force stage of a crimp operation). Further, in an embodiment of this implementation, the controller 50 can cause the ram 208, 718, 1124 to accelerate responsive to and based on the crimp quality indicator.

Accordingly, the controller 50 can be configured to receive a variety of different types of sensor information from a plurality of the sensors, correlate the different types of sensor information, and detect (or infer) various conditions about the workpiece and/or the crimp performed. As further examples, the controller 50 can determine, based on the crimp profile(s), a type and/or size of a connector, whether the user crimped a type of connector that was different than expected for the stroke, and/or whether the user performed the crimp at the wrong position on the workpiece (e.g., off-center).

In the examples described above, the controller 50 can determine a crimp profile based on the sensor information received from various sensors of the hydraulic tool 1900. Thus, in the examples described above, the tool head 1418 can be crimping tool head for performing the crimping operation. In additional or alternative examples, the tool head 1418 can include one or more blades for performing a wire stripping and/or cutting operation. In such examples, the principles described above with respect to the crimping operations can be extended to apply to wire stripping and/or cutting operations. For instance, the controller 50 can determine a stripping profile and/or a cut profile based on the sensor information received from the sensors. Similarly, the controller 50 can compare the stripping profile and/or cut profile to corresponding reference profiles to determine similar characteristics of the stripping and/or cutting operations described above.

Additionally, in FIG. 19, the hydraulic tool 1900 includes the sensors 122, 150, 1462, 1980, 1982, 1984, and/or 1986 described above. However, in other examples, the hydraulic tool 1900 can omit one or more of the sensors 122, 150, 1462, 1980, 1982, 1984, and/or 1986, and/or the hydraulic tool 1900 can include other sensors not shown in FIG. 19.

The description of the different advantageous embodiments has been presented for purposes of illustration and description, and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A hydraulic tool that performs a crimp on a workpiece, the hydraulic tool comprising:
   a tool head including a jaw operable to move to crimp the workpiece;
   a piston coupled to the tool head;
   a motor to drive the piston to move the jaw;
   a sensor configured to sense a condition over a stroke of the piston; and
   a controller in communication with the sensor, the controller being configured to run the motor until the jaw is in a closed position,
   wherein the controller
      receives sensor information from the sensor;
      determines, based on the sensor information, a crimp profile over the stroke of the piston; and
      determines, based on the crimp profile, a characteristic of the crimp performed on the workpiece.

2. The hydraulic tool of claim 1, wherein the sensor comprises a pressure sensor that senses a pressure of hydraulic fluid in a pump coupled to the motor; and
   wherein the crimp profile includes an indication of the pressure over the stroke of the piston.

3. The hydraulic tool of claim 2, and further comprising a second sensor including a distance sensor configured to sense a distance moved by the piston during the stroke; and wherein the crimp profile includes an indication of the pressure sensed by the pressure sensor over the distance sensed by the distance sensor.

4. The hydraulic tool of claim 3, wherein the controller includes a timer to determine a time over the stroke; and
wherein the crimp profile is based on the pressure sensed by the pressure sensor, the distance sensed by the distance sensor, and the time determined by the timer over the stroke.

5. The hydraulic tool of claim 1, wherein the sensor includes at least two of
a pressure sensor to sense a pressure of a hydraulic fluid in a pump;
a distance sensor to sense a distance moved by the piston during the stroke;
a timer to determine a time elapsed during the stroke;
a motor speed sensor to sense a speed of the motor during the stroke;
a current sensor to sense a current drawn by the motor during the stroke; and
a current sensor to sense a current drawn by a battery during the stroke.

6. The hydraulic tool of claim 1, wherein the characteristic of the crimp comprises an indication of whether the crimp was successfully performed.

7. The hydraulic tool of claim 1, wherein the characteristic of the crimp comprises an indication of a type of connector for the workpiece on which the crimp was performed.

8. The hydraulic tool of claim 1, wherein the controller is configured to receive user input from a user interface device; and
wherein the user input comprises an indication of a type of connector for the workpiece on which the crimp is to be performed.

9. The hydraulic tool of claim 8, wherein the controller is configured to:
determine, based on the user input, a reference crimp profile for the workpiece;
perform a comparison of the reference crimp profile to the crimp profile determined by the controller; and
determine, based on the comparison, whether the crimp was successfully performed on the workpiece.

10. The hydraulic tool of claim 8, wherein the controller is configured to:
determine, based on the user input, a reference crimp profile for the workpiece;
perform a comparison of the reference crimp profile to the crimp profile determined by the controller; and
determine, based on the comparison, whether the workpiece crimped is of a same type of connection as the type of connector indicated by the user input.

11. A method of operating a hydraulic power tool, the hydraulic power tool including a tool head having a jaw that moves to crimp a workpiece, the method comprising:
driving a motor to extend a piston and until the jaw is in a closed position, the piston coupled to the tool head;
sensing a condition with a sensor during a stroke of the piston;
sending sensor information from the sensor to a controller;
determining with the controller, based on the sensor information, a crimp profile over the stroke of the piston; and
determining with the controller, based on the crimp profile, a characteristic of the crimp performed on the workpiece.

12. The method of claim 11, wherein sensing a condition with a sensor includes sensing when the jaw is in a closed position based on a consistent position of a first sensor portion relative to a second sensor portion in the closed position.

13. The method of claim 11, wherein determining the crimp profile includes an indication of pressure sensed by a pressure sensor over a distance sensed by a distance sensor.

14. The method of claim 11, wherein determining the characteristic of the crimp includes an indication of whether the crimp was successfully performed.

15. The method of claim 11, and further comprising determining a time elapsed during the stroke.

16. The method of claim 11, and further comprising sensing a speed of the motor during the stroke.

17. The method of claim 11, and further comprising sensing a current drawn by the motor during the stroke.

18. The method of claim 11, and further comprising sensing a current drawn by a battery during the stroke.

19. The method of claim 11, and further comprising determining, based on user input, a reference crimp profile for the workpiece; and
performing a comparison of the reference crimp profile to the crimp profile determined by the controller.

* * * * *